United States Patent
Hill et al.

(10) Patent No.: US 10,633,934 B2
(45) Date of Patent: Apr. 28, 2020

(54) FLOWLINE JUNCTION FITTING WITH LONG-SWEEP BORE

(71) Applicant: KHOLLE Magnolia 2015, LLC, Houston, TX (US)

(72) Inventors: Larry Mitchel Hill, Cypress, TX (US); William Brent Stroebel, Houston, TX (US); Scott Taylor Donaldson, Spring, TX (US); E. Lee Colley, III, Houston, TX (US)

(73) Assignee: KHOLLE Magnolia 2015, LLC, Houston, TX (US)

( * ) Notice: Subject to any disclaimer, the term of this patent is extended or adjusted under 35 U.S.C. 154(b) by 120 days.

(21) Appl. No.: 15/627,904

(22) Filed: Jun. 20, 2017

(65) Prior Publication Data

US 2018/0187537 A1 Jul. 5, 2018

Related U.S. Application Data

(63) Continuation-in-part of application No. 15/399,102, filed on Jan. 5, 2017.

(51) Int. Cl.
| | |
|---|---|
| *E21B 17/04* | (2006.01) |
| *F16L 23/032* | (2006.01) |
| *F16L 41/02* | (2006.01) |
| *E21B 43/26* | (2006.01) |
| *F16L 41/00* | (2006.01) |

(Continued)

(52) U.S. Cl.
CPC .............. *E21B 17/04* (2013.01); *E21B 43/26* (2013.01); *F16L 23/032* (2013.01); *F16L 41/008* (2013.01); *F16L 41/02* (2013.01); *F16L 41/03* (2013.01); *F16L 23/02* (2013.01);

(Continued)

(58) Field of Classification Search
CPC .......... E21B 17/04; E21B 43/26; F16L 23/02; F16L 23/032; F16L 23/12; F16L 41/008; F16L 41/02; F16L 41/03; F16L 41/04; F16L 41/088
See application file for complete search history.

(56) References Cited

U.S. PATENT DOCUMENTS

| 6,302,141 B1 | 10/2001 | Markulec et al. |
| 6,874,538 B2 | 4/2005 | Bennett |

(Continued)

OTHER PUBLICATIONS

AGR Field Operations, *Laser Video Inspection* (undated).

(Continued)

*Primary Examiner* — Tara E Schimpf
(74) *Attorney, Agent, or Firm* — Keith B. Willhelm

(57) ABSTRACT

Missile flow lines are incorporated into frac manifolds, especially trailered or skidded frac manifolds. The missiles manifold the discharge from a plurality of pumps and comprise at least two junction fittings joined by spooled pipe. The junction fittings comprise a body having a primary bore and at least two feed bores. The intersections of the feed bores with the primary bore are offset axially from each other along the primary bore. The junction fittings are joined by flange unions to at least one spooled pipe such that the junction fittings and spooled pipe form a conduit including the primary bores. A discharge line from a pump may be joined to each feed union face of the junction fittings by a flange union. Thus, the discharge from the pumps may be manifolded into the conduit.

20 Claims, 13 Drawing Sheets

(51) Int. Cl.
*F16L 41/03* (2006.01)
*F16L 23/12* (2006.01)
*F16L 41/04* (2006.01)
*F16L 23/02* (2006.01)
*F16L 41/08* (2006.01)

(52) U.S. Cl.
CPC ............ *F16L 23/12* (2013.01); *F16L 41/023* (2013.01); *F16L 41/04* (2013.01); *F16L 41/088* (2013.01)

(56) References Cited

U.S. PATENT DOCUMENTS

| | | | |
|---|---|---|---|
| 7,686,041 | B2 | 3/2010 | Eidsmore et al. |
| 8,376,046 | B2 | 2/2013 | Broussard, II |
| 8,469,108 | B2 | 6/2013 | Kajaria et al. |
| 8,656,990 | B2 | 2/2014 | Kajaria et al. |
| 8,813,836 | B2 | 8/2014 | Kajaria et al. |
| 8,950,433 | B2 | 2/2015 | Manofsky et al. |
| 8,978,763 | B2 | 3/2015 | Guidry |
| 9,127,545 | B2 | 9/2015 | Kajaria et al. |
| 9,227,252 | B2 | 1/2016 | Horiguchi |
| 2007/0114039 | A1 | 5/2007 | Hobdy et al. |
| 2010/0300672 | A1 | 12/2010 | Childress et al. |
| 2011/0048695 | A1 | 3/2011 | Cherewyk et al. |
| 2012/0181016 | A1* | 7/2012 | Kajaria ................ E21B 43/26 166/177.5 |
| 2012/0181030 | A1* | 7/2012 | Kajaria ................ E21B 43/26 166/308.1 |
| 2015/0000766 | A1 | 1/2015 | Arizpe et al. |
| 2015/0184491 | A1 | 7/2015 | Kajaria et al. |
| 2016/0115773 | A1 | 4/2016 | Conrad et al. |
| 2017/0123437 | A1* | 5/2017 | Boyd .................... E21B 41/00 |

OTHER PUBLICATIONS

Belzona Polymerics Limited, *Next Generation Coatings for Erosion-Corrosion Protection* (undated).
Cameron, *Frac Manifold Systems—Increase Operational Efficiencies of Simultaneous Completion Operations* (© 2016 Schlumberger).
Cameron, *Monoline Flanged-Connection Fracturing Fluid Delivery Technology* (© 2016 Schlumberger).
Pipelines International, *The Ultimate Guide to Unpiggable Pipelines* (undated).
Forum Energy Technologies, *Smart Solutions. Powerful Products.* (undated—print date Jan. 2018) (with undated photos).

* cited by examiner

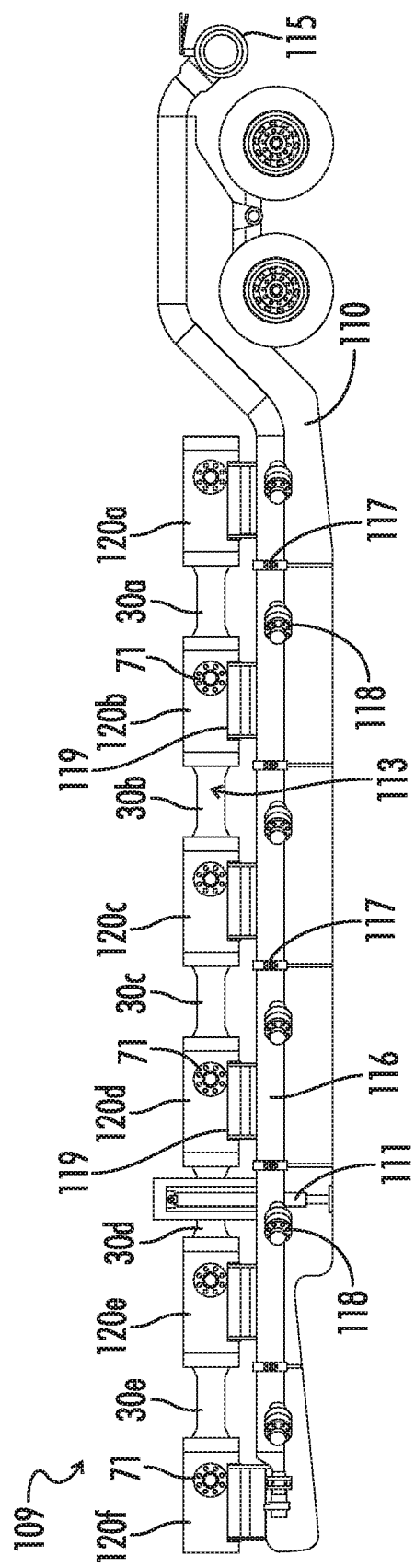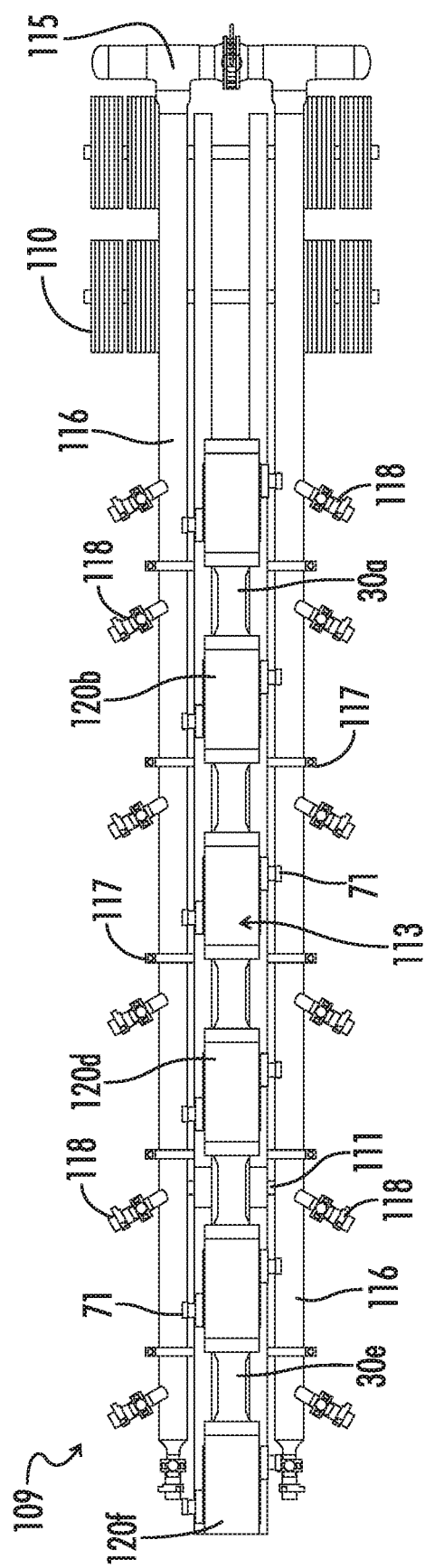

FLOWLINE JUNCTION FITTING WITH LONG-SWEEP BORE

FIELD OF THE INVENTION

The present invention relates generally to fluid transportation systems and flow lines used in those systems, and especially to frac manifolds, flow lines, and flowline components used to convey abrasive, corrosive fluids under high pressure as are common, for example, in the oil and gas industry.

BACKGROUND OF THE INVENTION

Hydrocarbons, such as oil and gas, may be recovered from various types of subsurface geological formations. The formations typically consist of a porous layer, such as limestone and sands, overlaid by a nonporous layer. Hydrocarbons cannot rise through the nonporous layer. Thus, the porous layer forms a reservoir, that is, a volume in which hydrocarbons accumulate. A well is drilled through the earth until the hydrocarbon bearing formation is reached. Hydrocarbons then are able to flow from the porous formation into the well.

In what is perhaps the most basic form of rotary drilling methods, a drill bit is attached to a series of pipe sections referred to as a drill string. The drill string is suspended from a derrick and rotated by a motor in the derrick. A drilling fluid or "mud" is pumped down the drill string, through the bit, and into the well bore. This fluid serves to lubricate the bit and carry cuttings from the drilling process back to the surface. As the drilling progresses downward, the drill string is extended by adding more pipe sections.

When the drill bit has reached the desired depth, larger diameter pipes, or casing, are placed in the well and cemented in place to prevent the sides of the borehole from caving in. The well may be extended by drilling additional sections and installing large, but somewhat smaller pipes, or liners. The liners also are typically cemented in the bore. The liner may include valves, or it may then be perforated. In either event, openings in the liner are created through which oil can enter the cased well. Production tubing, valves, and other equipment are installed in the well so that the hydrocarbons may flow in a controlled manner from the formation, into the lined well bore, and through the production tubing up to the surface for storage or transport.

Hydrocarbons, however, are not always able to flow easily from a formation to a well. Some subsurface formations, such as sandstone, are very porous. Hydrocarbons can flow easily from the formation into a well. Other formations, however, such as shale rock, limestone, and coal beds, are only minimally porous. The formation may contain large quantities of hydrocarbons, but production through a conventional well may not be commercially practical because hydrocarbons flow though the formation and collect in the well at very low rates. The industry, therefore, relies on various techniques for improving the well and stimulating production from formations. In particular, various techniques are available for increasing production from formations which are relatively nonporous.

Perhaps the most important stimulation technique is the combination of horizontal well bores and hydraulic fracturing. A well will be drilled vertically until it approaches a formation. It then will be diverted, and drilled in a more or less horizontal direction, so that the borehole extends along the formation instead of passing through it. More of the formation is exposed to the borehole, and the average distance hydrocarbons must flow to reach the well is decreased. Fractures then are created in the formation which will allow hydrocarbons to flow more easily from the formation.

Fracturing a formation is accomplished by pumping fluid, most commonly water, into the well at high pressure and flow rates. Proppants, such as grains of sand, ceramic or other particulates, usually are added to the fluid along with gelling agents to create a slurry. The slurry is forced into the formation at rates faster than can be accepted by the existing pores, fractures, faults, vugs, caverns, or other spaces within the formation. Pressure builds rapidly to the point where the formation fails and begins to fracture. Continued pumping of fluid into the formation will tend to cause the initial fractures to widen and extend further away from the well bore, creating flow paths to the well. The proppant serves to prevent fractures from closing when pumping is stopped.

A formation rarely will be fractured all at once. It typically will be fractured in many different locations or zones and in many different stages. Fluids will be pumped into the well to fracture the formation in a first zone. After the initial zone is fractured, pumping is stopped, and a plug is installed in the liner at a point above the fractured zone. Pumping is resumed, and fluids are pumped into the well to fracture the formation in a second zone located above the plug. That process is repeated for zones further up the formation until the formation has been completely fractured.

Once the well is fractured, the large quantities of water and sand that were injected into the formation eventually must be allowed to flow out of the well. The water and sand will be separated from hydrocarbons produced by the well to protect downstream equipment from damage and corrosion. The production stream also may require additional processing to neutralize corrosive agents in the stream.

Systems for successfully completing a fracturing operation, therefore, are extensive and complex, as may be appreciated from FIG. 1. Water from tanks 1 and gelling agents dispensed by a chemical unit 2 are mixed in a hydration unit 3. The discharge from hydration unit 3, along with sand carried on conveyors 4 from sand tanks 5 is fed into a blending unit 6. Blender 6 mixes the gelled water and sand into a slurry. The slurry is discharged through low-pressure hoses 7 which convey it into two or more low-pressure lines 8 in a frac manifold 9. The low-pressure lines 8 in frac manifold 9 feed the slurry to an array of pumps 10, perhaps as many as a dozen or more, through low-pressure "suction" hoses 11.

Pumps 10 take the slurry and discharge it at high pressure through individual high-pressure "discharge" lines 12 into two or more high-pressure lines or "missiles" 13 on frac manifold 9. Missiles 13 flow together, i.e., they are manifolded on frac manifold 9. Several high-pressure flow lines 14 run from the manifolded missiles 13 to a "goat head" 15. Goat head 15 delivers the slurry into a "zipper" manifold 16 (also referred to by some as a "frac manifold"). Zipper manifold 16 allows the slurry to be selectively diverted to, for example, one of two well heads 17. Once fracturing is complete, flow back from the fracturing operation discharges into a flowback manifold 18 which leads into flowback tanks 19.

Frac systems are viewed as having "low-pressure" and "high-pressure" sides or, more simply, as having low sides and high sides. The low side includes the components upstream of the inlet of pumps 10, e.g., water tanks 1, hydration unit 3, blending unit 6, and the low-pressure lines 8 of frac manifold 9, which operate under relatively low pressures. The high side includes all the components downstream of the discharge outlets of pumps 10, e.g., the high-pressure missiles 13 of frac manifold 9 and flow lines 14 running to goat head 15, which operate under relatively high pressures.

The larger units of a frac system are transported to a well site on skid, trailers, or trucks and then connected by one kind of conduit or another. The conduits on the low-pressure side typically will be flexible hoses, such as blender hoses 7 and suction hoses 11. On the other hand, flow lines 14 running to goat head 15 and other high-pressure side conduits will be subject to extremely high pressures. They must be more rugged. They also typically will be assembled on site.

Flow lines 14 and other portions of the high-side that are assembled on site are made up from a variety of components often referred to as "frac iron," "flow iron," or "ground iron." Such components include sections of straight steel pipe, such as pup joints. They also include various fittings, such as tees, crosses, laterals, and wyes, which provide junctions at which flow is split or combined. In addition to junction fittings, flowline components include fittings which are used to alter the course of a flow line. Such directional fittings include elbows and swivel joints. High-pressure flow lines also incorporate gauges and other monitoring equipment, as well as control devices such as shut off, plug, check, throttle, pressure release, butterfly, and choke valves.

Because frac systems are required at a site for a relatively short period of time, frac iron components often are joined by unions. Unions allow the components to be connected ("made up") and disconnected ("broken down") relatively quickly. The three types of unions commonly used in frac systems are hammer (or "Weco®") unions, clamp (or "Greyloc®") unions, and flange unions. Though spoken of in terms that may imply they are discreet components, unions are actually interconnected subassemblies of the components joined by the union. A male sub will be on one component, and a mating female sub will be on the other. The subs then will be connected to each other to provide the union.

Flange unions may be made up and broken down with relative ease. Their basic design is robust and reliable, and like other flowline components, they are manufactured from heavy, high tensile steel. Thus, they have been adapted for low pressure (1,000 to 2,000 psi), medium pressure (2,000 to 4,000 psi), and high pressure service (6,000 to 20,000 psi). Moreover, unlike hammer and clamp unions, flange unions do not rely on seals that are exposed to fluids passing through the union.

Flange unions, as their name implies, typically provide a connection between two flanged components, such as spooled pipe or simply "spools." Spooled pipe is provided with annular flanges extending radially outward from each end, thus giving the pipe the appearance of a spool. The flanges provide flat surfaces or faces which allow two spools to mate at their flanges. The flanges also are provided with a number of bolt holes. The holes are arranged angularly around the flange. Thus, spooled pipes may be connected by bolting mating flanges together. Each flange will have an annular groove running concentrically around the pipe opening. An annular metal seal is carried in the grooves to provide a seal between the flanges.

Though not entirely apparent from the schematic representation of FIG. 1, it will be appreciated that conventional frac systems are assembled from a very large number of individual components. Assembly of so many units on site can be time consuming, expensive, and hazardous. Thus, some components of a frac system are assembled off site on skids or trailers and transported as a unit to the well site.

Commonly skidded units include not only process units, such as blender 6 and pumps 10, but also flow units. Frac manifold 9, for example, is an assembly of pipes, junctions, valves, and other flowline components that typically are assembled off-site. Collectively, they provide a flow unit that manifolds, distributes, and controls discharge from pumps 10. Zipper manifold 16 is another flow unit that at times is assembled off-site from separate flowline components. Zipper manifold 16 receives flow from flow lines 14 and selectively distributes it to multiple well heads 17. Such units may have been assembled on site in the past. By skidding them, or mounting them on a trailer, assembly time at the well site is greatly reduced. Moreover, the components typically may be assembled more efficiently and reliably, and may be tested more easily in an off-site facility.

At the same time, because they are transported as a unit, trailered and skidded units are subject to spatial constraints that typically are not so severe as on site. Frac trailers, for example, have multiple flow lines incorporating a large number of flowline components, both on the high-pressure side and the low-pressure side. Multiple flow lines are manifolded. Providing all of those flow lines and manifolds on a trailer which meets highway regulatory requirements often results in a complex, cluttered design which may be difficult or impossible to service on site.

A well head also is fixed. Trailered and skidded units can be quite large, heavy, and moveable only with difficulty and limited precision. Flow lines, therefore, necessarily incorporate directional fittings, such as elbows and swivel joints, which allow its course to be altered to accommodate two unaligned units.

Elbow joints are simply curved sections of pipe which provide, for example, a 90° turn in a line. Swivel joints most commonly are an assembly of elbow conduits, usually three, with rotatable joints. The joints are packed with bearings, typically ball bearings, which allow the elbow conduits to rotate relative to each other. Swivel joints, therefore, can accommodate varying degrees of misalignment between the components which they connect and can provide considerable flexibility in assembling a flow line between essentially immovable points.

Though much less common, swivel flanges also are used to provide similar flexibility. Swivel flanges have a flange mounted on a hub. The hub is formed, for example, at one end of a length of pipe. Bearings, usually roller bearings, are packed around the hub, and the flange can rotate around the hub on the bearings. When joined together, a pair of swivel-flanged pipes and a pair of elbow joints, like swivel joints, can accommodate varying alignments between components to be joined. Consequently, it is rare, if ever, that the high-side of a frac system does not incorporate at least one or, more likely, multiple swivel joints or swivel flanges.

The large number of individual components in a frac system is compounded by the fact that most conventional frac systems incorporate a large number of relatively small flow lines, typically 3" and 4" flow lines. In part that is unavoidable. The pumps cannot be deployed in series and the flow lines carrying their individual discharges must be manifolded. Likewise, if multiple wells are to be serviced by the same array of pumps without assembling and disassembling flow lines, at some point their collective discharge must be split or directed into different flowline segments.

On the other hand, multiple flow lines in many instances represent a design choice. That is, certain flow rates and pressures will be required to fracture a particular well. Those flow rates and pressures will determine the number and capacities of the pumps. The high-pressure side then is designed to deliver the required flow rate without exceeding a maximum or "erosional" flow velocity, typically about 40'/sec, through the system. Additional flow lines often are added to provide higher flow rates into a well. The net result is that a fracking system often is so complicated that it resembles to the uninitiated a tangled mass of spaghetti.

Efforts have been made to simplify the flow line by incorporating fewer segments. For example, the conventional frac system illustrated in FIG. 1 includes four flow lines 14 running from the high-pressure lines 13 of frac manifold 9 to goat head 15. Some frac systems now employ a single, larger flowline segment running in place of four smaller lines. A single larger flow line will incorporate fewer parts and, therefore, fewer potential leak points. Both in terms of direct material and labor costs, a single larger flow line often will be less expensive than multiple smaller lines.

Frac jobs also have become more extensive, both in terms of the pressures required to fracture a formation and the time required to complete all stages of an operation. Prior to horizontal drilling, a typical vertical well might require fracturing in only one, two or three zones at pressures usually well below 10,000 psi. Fracturing a horizontal well, however, may require fracturing in 20 or more zones. Horizontal wells in shale formations such as the Eagle Ford shale in South Texas typically require fracturing pressures of at least 9,000 psi and 6 to 8 hours or more of pumping. Horizontal wells in the Haynesville shale in northeast Texas and northwest Louisiana require pressures around 13,500 psi. Pumping may continue near continuously—at flow rates of 2 to 3 thousand gallons per minute (gpm)—for several days before fracturing is complete.

Moreover, at least in the early stages of production, the flow back after fracturing also will be at high pressure and flow rates. The initial production stream from a fractured well flows at pressures in the range of from 3,000 to 5,000 psi, and more and more commonly up to 10,000 psi. The flow rates can approach a million cubic feet per hour or more.

Given the high number of components, leaking at unions is always a concern in frac systems. The unions may not always be assembled properly. Even when assembled to specification, however, such issues are exacerbated by the extremely high pressures and flow rates through the system. Many unions also incorporate elastomeric seals which are exposed to flow through the conduit and are particularly susceptible to leaking.

Moreover, the abrasive and corrosive nature of the slurry flowing through a frac system not only will accelerate deterioration of exposed elastomeric seals, it can rapidly erode and weaken conduit walls. Flow through relatively long straight sections of pipe is relatively laminar. Flow through other areas, however, such as unions where exposed seals often are present, may be quite turbulent. Erosion also is a more significant issue where a flow line changes directions. Flow will more directly impact conduit walls, causing more abrasion than that caused simply by fluid passing over the walls. The flowlines in conventional frac manifolds, in particular, typically have numerous, relatively sharp turns which are susceptible to damage.

Flowline components also are quite expensive. Swivel joints and swivel flanges in particular are expensive and often comprise the single largest part expense of a high-side flow line. At the same time, the general issues discussed above seem to be more focused in respect to swivel joints and swivel flanges. Swivel joints often incorporate exposed elastomeric seals. Flow through swivel joints is relatively turbulent. Because they incorporate rotatable joints and connect unaligned components, swivel joints and swivel flanges are particularly susceptible to bending stress caused by vibration in the flow line. They also may be disassembled on site for service and may not always be reassembled to specification.

Finally, the cost of repeatedly recertifying or replacing components can add significantly to operating costs of the system. Thus, high-pressure flowline components are required to endure extremely abrasive fluids flowing at extremely high pressures and rates and, hopefully, to do so over an extended service life.

The statements in this section are intended to provide background information related to the invention disclosed and claimed herein. Such information may or may not constitute prior art. It will be appreciated from the foregoing, however, that there remains a need for new and improved frac manifolds and high-pressure flow lines and flowline components and methods for assembling flow lines and fluid transportation systems. Such disadvantages and others inherent in the prior art are addressed by various aspects and embodiments of the subject invention.

SUMMARY OF THE INVENTION

The subject invention, in its various aspects and embodiments, relates generally to fluid transportation systems and flow lines used in those systems and encompasses various embodiments and aspects, some of which are specifically described and illustrated herein. One broad embodiment provides for missile flow lines which may be incorporated into frac manifolds, especially trailered or skidded frac manifolds. The missiles manifold the discharge from a plurality of pumps and comprise at least two junction fittings joined by spooled pipe. The junction fittings comprise a body having a primary bore and at least two feed bores. The primary bore extends axially through the body between first and second primary faces. The primary faces are union faces adapted for connection to a flowline component by a flange union. The feed bores extend radially through the body from a feed face to an intersection with the primary bore. The feed faces also are union faces adapted for connection to a flowline component by a flange union. The intersections of the feed bores with the primary bore are offset axially from each other along the primary bore. The junction fittings are joined by flange unions to at least one spooled pipe such that the junction fittings and spooled pipe form a conduit including the primary bores. A discharge line from a pump may be joined to each feed union face of the junction fittings by a flange union. Thus, the discharge from the pumps may be manifolded into the conduit.

Other aspects and embodiments provide such missiles where at least one feed bore forms a long-sweep curve into the primary bore, preferably a long-sweep curve having a sweep ratio of from about 1.25 to about 8. Still other embodiments provide such missiles where the feed bores are straight-line bores.

In other aspects, the missiles may have feed bores intersecting with the primary bore at an angle of approximately 90°, or at an interior angle of about 45°, or at an interior angle of from about 150 to about 60°.

Additional embodiments provide such missiles where the fitting body has a generally cylindrical configuration, where the body is machined from a cylindrical bar, where the fitting body has a generally polyhedral configuration, or where the fitting body has a generally prismatic configuration.

Still other embodiments provide frac manifolds which are mounted on a skid or trailer and comprise various embodiments of the novel missiles, preferably a single such missile, and at least one low-pressure suction line. Other embodiments include high-pressure fluid transportation system comprising various embodiments of the novel missiles. Embodiments also include methods of assembling a high-pressure fluid transportation system where the method comprises assembling a novel missile into the system by connecting it to a flowline component by a flange union.

Other aspects and embodiments of the invention provide offset lateral cross junction fittings for flow lines. The junction fittings are adapted to manifold the discharge from a plurality of pumps and comprise a body having a primary bore and at least two feed bores. The primary bore extends axially through the body between first and second primary union faces. The union faces are adapted for connection to a flowline component by a flange union. The feed bores extend through the body from a feed union face to an intersection with the primary bore. The feed union faces are adapted for connection to a component of a discharge line from a the frac pump by a flange union. The intersection between the feed bores and the primary bore has an interior angle of substantially less than 90° and the intersections of the feed bores are offset axially from each other.

Additional embodiments provide such fittings where the body is cylindrical, where the body is machined from a cylindrical bar, where the body is polyhedral.

In other aspects, the invention provides such junction fittings where at least one feed bore forms a long-sweep curve into the primary bore, preferably where the feed bore has a sweep ratio of from about 1.25 to about 8. Other embodiments provide such fittings where the feed bores intersect with the primary bore at an interior angle of about 450 or at an interior angle of from about 15° to about 60°.

Still other embodiments provide flow lines for a high-pressure fluid transportation system. The flow lines comprise various embodiments of the novel flowline fittings. The flowline fittings are assembled into the flow line by flange unions and connected to discharge lines from the pumps by flange unions. Other embodiments provide high-pressure fluid transportation systems which comprise various embodiments of the novel flow lines. Additional embodiments provide skidded or trailered frac manifolds comprising various embodiments of the novel flowline fittings and at least one low-pressure line. Other embodiments provide methods of assembling a flow line for a high-pressure fluid transportation system. Various embodiments of the novel flowline fittings are assembled into the flow line by connecting them to a flowline component by a flange union.

Other aspects and embodiments of the invention provide feed fittings with long-sweep curves. The feed fittings are adapted to combine the flow from at least two flowlines and comprise a body having a straight-line primary bore and a feed bore. The primary bore extends axially through the body between first and second primary union faces. The union faces are adapted for connection to a flowline component by a flange union. The feed bore extending through the body from a feed union face to an intersection with the primary bore. The feed union face is adapted for connection to a flowline component by a flange union. The feed bore forms a long sweep curve into the primary bore.

Other embodiments provide such feed fittings where the feed bore has a sweep ratio of from about 1.25 to about 8. Still other embodiments provide such fittings where the feed bore intersects with the primary bore at an angle of approximately 90°, where the feed bore intersects with the primary bore at an interior angle of about 45°, or where the feed bore intersects with the primary bore at an interior angle of from about 15° to about 60°. Additional embodiments provide such feed fittings where the fitting comprises a second the feed bore.

Further aspects and embodiments provide flow lines for a high-pressure fluid transportation system which comprise various embodiments of the novel feed fittings. Still other embodiments provide high-pressure fluid transportation systems comprising various embodiments of the novel flow lines. Additional embodiments provide methods of assembling a flow line for a high-pressure fluid transportation system. Various embodiments of the novel feed fittings are assembled into a flow line by connecting the feed fitting to a flowline component by a flange union.

Finally, still other aspects and embodiments of the invention will have various combinations of such features as will be apparent to workers in the art.

Thus, the present invention in its various aspects and embodiments comprises a combination of features and characteristics that are directed to overcoming various shortcomings of the prior art. The various features and characteristics described above, as well as other features and characteristics, will be readily apparent to those skilled in the art upon reading the following detailed description of the preferred embodiments and by reference to the appended drawings.

Since the description and drawings that follow are directed to particular embodiments, however, they shall not be understood as limiting the scope of the invention. They are included to provide a better understanding of the invention and the manner in which it may be practiced. The subject invention encompasses other embodiments consistent with the claims set forth herein.

BRIEF DESCRIPTION OF THE DRAWINGS

FIG. 3 is a side elevational view of trailer-mounted frac manifold 109 showing missile 113 of frac manifold 109 and a first preferred embodiment of the flowline components of the subject invention, namely, offset cross junction 120 having long sweep feed bores.

FIG. 4 is a top view of frac trailer 109 shown in FIG. 3.

Figure 1:
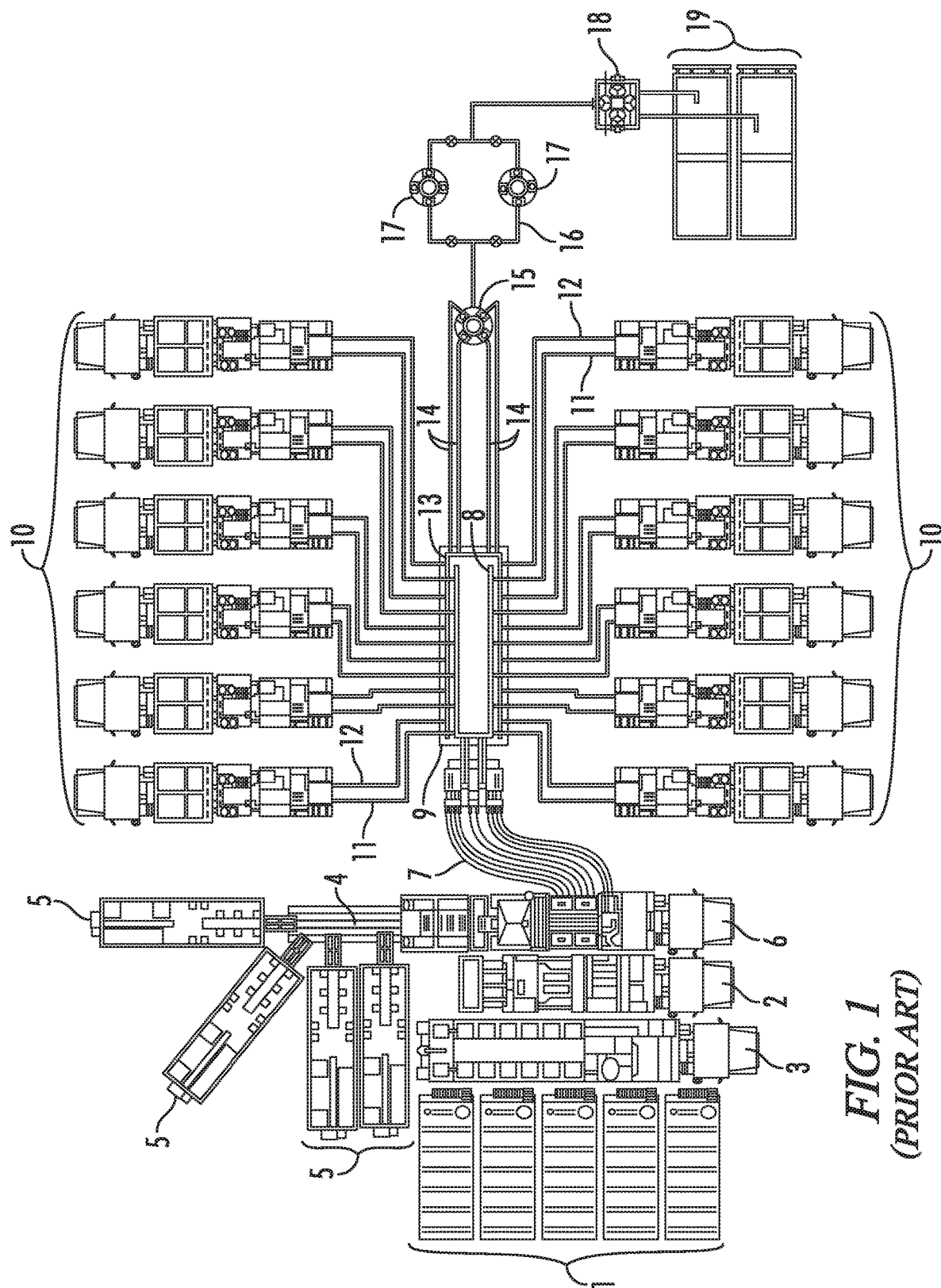
FIG. 1 (prior art) is a schematic view of a system for fracturing a well and receiving flow back from the well, which system includes various high-pressure flow lines, such as flow lines 12 and 14.

In the drawings and description that follows, like parts are identified by the same reference numerals. The drawing figures are not necessarily to scale. Certain features of the embodiments may be shown exaggerated in scale or in somewhat schematic form and some details of conventional design and construction may not be shown in the interest of clarity and conciseness.

DESCRIPTION OF ILLUSTRATIVE EMBODIMENTS

The invention, in various aspects and embodiments, is directed generally to fluid transportation systems and flow lines used in those systems, and especially to frac manifolds, flow lines, and flowline components that are used to convey abrasive, corrosive fluids under high pressure. Various specific embodiments will be described below. For the sake of conciseness, all features of an actual implementation may not be described or illustrated. In developing any actual implementation, as in any engineering or design project, numerous implementation-specific decisions must be made to achieve a developers' specific goals. Decisions usually will be made consistent within system-related and business-related constraints, and specific goals may vary from one implementation to another. Development efforts might be complex and time consuming and may involve many aspects of design, fabrication, and manufacture. Nevertheless, it should be appreciated that such development projects would be a routine effort for those of ordinary skill having the benefit of this disclosure.

The novel frac manifolds, flowlines, and flowline components typically will be used to connect process or flow units for temporary fluid transportation systems. They are particularly useful for temporary installations that must be assembled and disassembled on site and which may be installed at various sites. Such systems are common in chemical and other industrial plants, on marine dredging vessels, strip mines, and especially in the oil and gas industry. Frac systems, such as those shown in FIG. 1, are a very common application where temporary high-pressure flow lines are routinely assembled and disassembled at various sites to provide fluid conduits between process or flow units for different wells.

Figure 2:
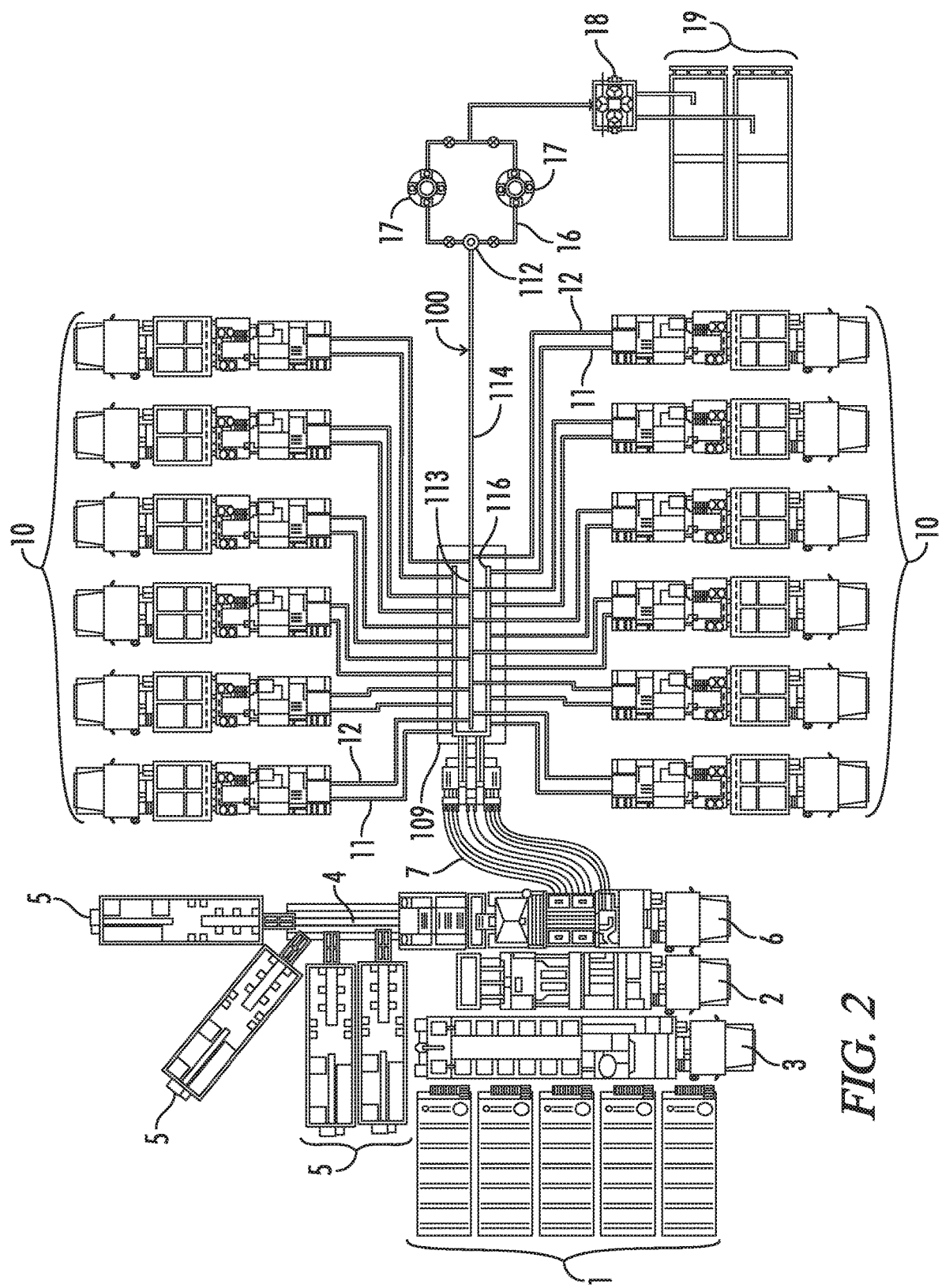
FIG. 2 is a schematic view of a frac system incorporating a first preferred embodiment 109 of the novel frac manifolds of the subject invention. Missile 113 of frac manifold 109 is coupled to a single flow line 114 running to junction head 112 of zipper manifold 16, thus providing a single high-pressure conduit 100 between pumps 10 and zipper manifold 16.

The novel frac manifolds, flow lines, and flowline components are particularly suited for use in frac systems such as the system shown in FIG. 1. For example, a first preferred embodiment 109 of the frac manifolds of the subject invention is shown schematically in FIG. 2. Frac manifold 109, and the novel frac system shown in FIG. 2, is identical in many respects to frac manifold 9 and the frac system of FIG. 1. It will be noted that frac manifold 9 incorporates a pair of relatively small diameter missiles 13, one on each side of frac manifold 9. The two missiles 13 receive the discharge from pumps 10, are manifolded, and discharge into four relatively small diameter high-pressure flow lines 14 which feed into goat head 15.

In contrast, novel frac manifold 109 incorporates a single missile 113 to which are connected all of the pump discharge lines 12. Missile 113 receives the entire discharge of pumps 10. Single missile 113 in turn discharges into a single flow line 114 running to junction head 115 of zipper manifold 16. Flow line 100, i.e., the assembly of missile 113 and flow line 114, thus provides a single high-pressure conduit between pumps 10 and zipper manifold 16.

Frac manifold 109 is shown in further detail in FIGS. 3-4. As seen therein, frac manifold 109 is mounted on a trailer 110 and generally comprises a suction line manifold 115, two suction lines 116, and missile 113. Trailer 110 incorporates a frame having two lateral I-beams connected by cross members. The frame provides the primary structure on which suction manifold 115, suctions lines 116, missile 113, the suspension and wheels, and other trailer components are mounted. Trailer 110 preferably is provided with a mechanism for lifting its forward end, such as hydraulic jacks 111, so that it may be hooked up to and unhooked from a truck as required. It also will be noted that the frame of trailer 110 is configured such that when trailer 110 is unhooked the frame will rest on the ground. Missile 113 and suction lines 116 will be substantially horizontal. Leveling mechanisms may be provided, however, if desired. Likewise, trailer 110 may incorporate other features commonly provided in conventional frac trailers, and the trailers themselves may be of many different conventional designs.

Suction manifold 115 is mounted near the rear of trailer 110 and receives the discharge from blender 6 via blender hoses 7 (not shown in FIGS. 3-4). Suction lines 116 may be mounted to the frame along each side of trailer 110 on suitable mounts, such as brackets 117. Suction hoses 11 leading to pumps 10 (not shown in FIGS. 3-4) may be connected to suction connections 118 on suction lines 116.

Connections 118 may be hammer union subs or subs of other conventional unions. Pumps 10 on one side of frac trailer 109 may be connected to one suction line 116, and pumps 10 on the other side may be connected to the other suction line 116.

Missile 113 incorporates a first preferred embodiment of the novel flowline components, offset cross junction 120. More specifically, missile 113 has six offset cross junctions 120a-120f which are interconnected by spools 30a-30e. Missile 113 is mounted along the center of trailer 110 on suitable mounts, for example, cradles 119. Offset cross junctions 120a-120f are connected to an array of pumps 10 via pump discharge lines 12 (not shown in FIGS. 3-4). More specifically, each offset cross junction 120a-120f is connected to two pumps 10 positioned on opposite sides of frac trailer 109. They may be referred to a "cross" junctions in that, as described below, they have two feed bores entering into a primary conduit. They may be referred to as an "offset" cross in that the feed bores are offset axially from each other.

Figure 7:
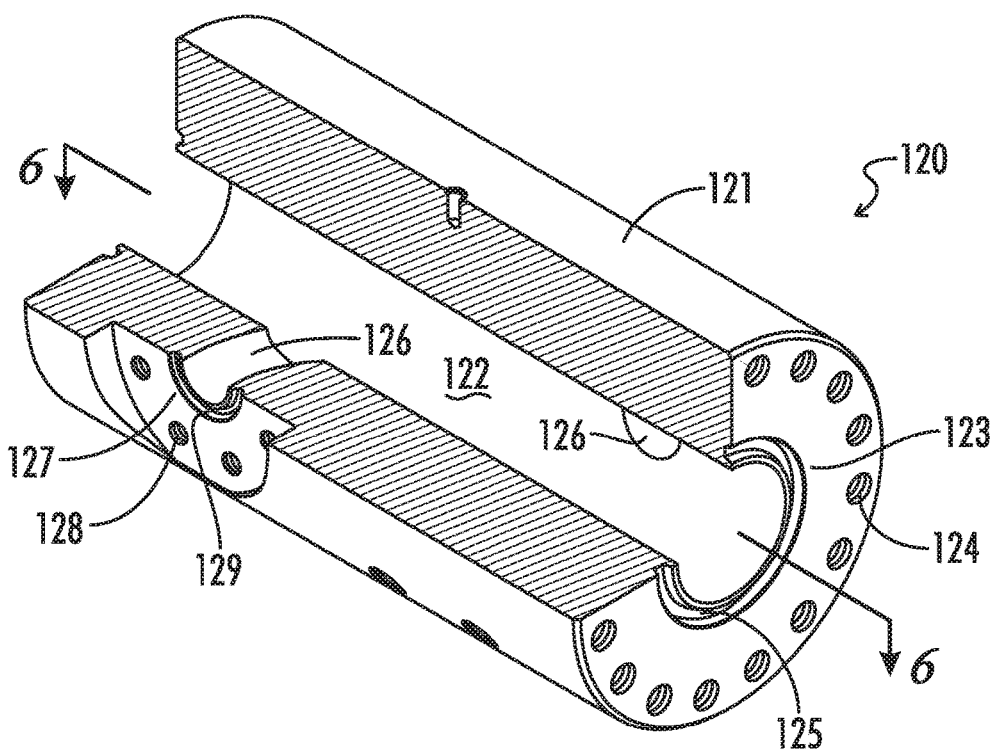
FIG. 7 is an isometric view, with an axial quarter-section removed, of offset cross junction 120 which is assembled into missile 113 of frac manifold 109 shown in FIGS. 3-6.
Figure 8:
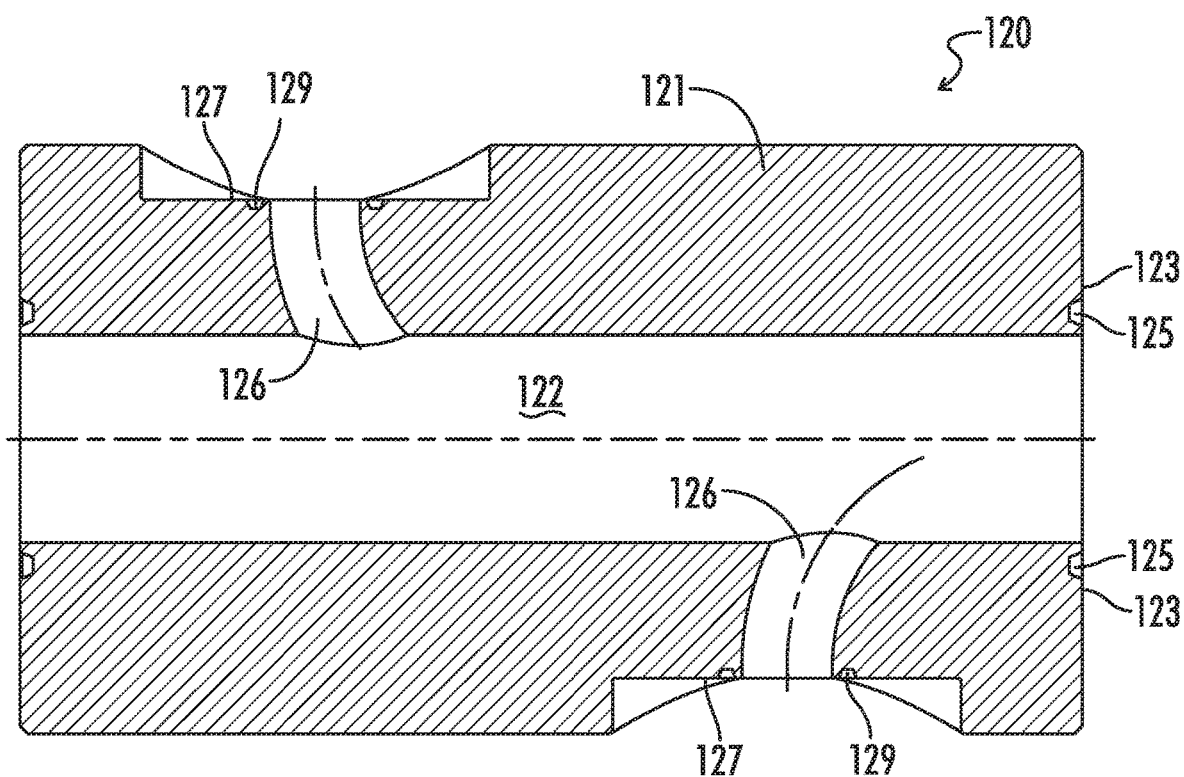
FIG. 8 is a cross-sectional view of offset cross junction 120 shown in FIG. 7.

Offset cross junctions 120 are shown in greater detail in FIGS. 7-8. As seen therein, offset cross junctions 120 have a somewhat elongated, generally cylindrical body 121 having a main or primary bore 122. Bore 122 provides the primary conduit through which slurry passes as it is conveyed towards well head 17. Primary bore 122 extends between opposing, generally parallel, flat surfaces or union faces 123 on each end of body 121. Union faces 123 may be viewed as the primary union faces for junctions 120. The center of bore 122 may be viewed as defining the central axis of offset cross junction 120.

As appreciated from FIG. 7, union faces 123 are provided with, for example, 16 bottomed holes 124. Holes 124 typically are threaded to accept standing bolts or other threaded connectors (not shown). Alternately, holes 124 may be adapted to receive threaded studs (not shown). Holes 124 are arranged angularly about bore 122. When provided with studs or other threaded connectors, holes 124 allow mating components, such as spools 30 to be joined to offset cross junctions 120 by a flange-type union. More or fewer holes 124 and connectors may be provided depending upon the size of the union between the components and the pressures for which the union will be rated.

Typically, union faces 123 will be provided with a metal seal (not shown). The seal is disposed in a groove, such as annular groove 125 extending around the openings of bore 122. A seal is generally required to avoid leakage at union faces 123. Also, and though described as "flat" herein, union faces 123 typically will have a very slight annular boss extending upwards around the openings of bore 122. The annular boss will help ensure that the abutment between mating union faces is properly loaded when the union is made up. The designs and features of union faces in particular and flange unions in general are well known, however, and the union faces on junction 120 and the other fittings disclosed herein may be varied in accordance with common practice in the art.

Offset cross junctions 120 also are provided with a pair of bores 126 which provide conduits for feeding discharge from an individual pump 10 into primary bore 122. Feed bores 126 extend inward from flat union faces 127 which are milled or otherwise provided on the outer surface of body 121. Feed union faces 127 are on opposite sides of body 121, i.e., they are spaced 180° about the circumference of body 121, and are generally parallel.

Feed bores 126 lead into and intersect with primary bore 122. It will be noted that bores 126 form what may be referred to as long-sweep curves leading into primary bore 122. As used herein, a "long-sweep" curve, when used in reference to a particular bore or passage, shall be understood as meaning that the sweep ratio of the bore is about 1.25 or greater. The "sweep ratio" in turn shall be understood as the ratio of the radius of the curve to the diameter of the bore in which the curve is formed. The sweep ratio of bores 126 is approximately 2.5.

It also will be noted that feed bores 126 are offset axially from each other. That is, their respective intersections with primary bore 122 are spaced apart along the length or axis of primary bore 122. Thus, feed bores 126 will discharge into primary bore at spaced intersections, one upstream from the other. As discussed further below, providing a long-sweep in feed bores 126, and offsetting the intersections between feed bores 126 and primary bore 122 will help to minimize areas of concentrated erosion in cross junctions 120.

Like primary union faces 123, feed union faces 127 comprise a plurality of holes 128, in this case 8. Holes 128 allow mating components, such as pump discharge lines 12, to be joined to offset cross junctions 120 by threaded studs or other threaded connectors. Feed union faces 127 also will have a metal seal (not shown) disposed in an annular recess 129. Like union faces 123, feed union faces 127 may be varied in accordance with common practice in the art.

Offset cross junctions 120a-120f are joined by spools 30a-30e. Spools 30 are conventional spools. As such they comprise a pipe which provides a conduit for conveying fluid between offset cross junctions 120. A pair of flanges are provided at each end of the pipe. The outer flat surfaces of the flanges provide union faces. Each of the flanges is provided with, for example, 16 bolt holes extending through the flanges. The holes are adapted to accommodate the passage of threaded connectors, such as threaded studs or bolts. The holes allow spools 30 to be joined, for example, to cross junctions 120 in missile 113. The flanges also are provided with a metal seal. The union faces on spools 30, however, may be varied as desired in accordance with common practice in the art.

Discharge lines 12 of pumps 10 feed into missile 113 of frac trailer 109. They may be connected to offset cross junctions 120 by various conventional unions. Discharge lines 12 may terminate in a flanged sub allowing them to be connected directly to cross junctions 120 at feed union faces 127. Alternately, a flanged, female sub 71 of a hammer union may be connected to feed union faces 127 as shown in FIGS. 3-6. Discharge lines 12 of pumps 10 then may be connected to cross junctions 120 by hammer unions.

Thus, in contrast to conventional frac manifold 9, which has two relatively small manifolding missiles 13 which themselves are manifolded, novel frac trailer 109 comprises a single, larger, straight missile 113 which receives the discharge from all pumps 10. That is, in conventional frac systems, such as those shown in FIG. 1, pumps 10 will be lined up on both sides of frac manifold 9. Pumps 10 on one side of frac manifold 9, as represented schematically in FIG. 1, typically will feed into the missile 13 running along that side of frac manifold 9. Pumps 10 which are lined up on the other side will feed into the missile 13 running on the other side of frac manifold 9. Missiles 13 are manifolded by a section of pipe which connects their downstream ends at right angles. The combined discharge from missiles 13 then is distributed into four high-pressure flow lines 14 which run to goat head 15.

As shown schematically in FIG. 2, pumps 10 from both sides of frac manifold 109 all feed into missile 113. Offset cross junctions 120 allow two pumps 10 to feed into missile 113 from opposite sides of trailer 110. Frac trailer 109, therefore, will have a simpler, less cluttered design. It may be assembled more easily, and when in service, will allow greater access to manifold components for hook up and service. More importantly, however, novel frac manifolds incorporating a single, larger missile, such as missile 113, should provide better wear resistance and a longer service life than conventional frac manifolds incorporating multiple missiles.

That is, the slurry flowing through flow lines is highly abrasive and corrosive, moves at relatively high velocities under high pressure, and is quite turbulent in many areas. Consequently, flowline components tend to suffer material loss which can weaken the part and shorten its service life. The material loss results from a number of different dynamics, including ductile erosion and brittle erosion, both of which are exacerbated by corrosion.

Ductile erosion results from entrained sand and other particles dragging along the inner walls and cutting or ploughing into the walls. The angle of impingement typically is small, less than 30°. Ductile erosion is the primary dynamic in relatively straight sections of flow lines. Brittle erosion results from entrained sand impinging on the walls at near normal to the surface, the impact causing tiny radial cracks in the wall. Brittle erosion is the primary dynamic in turbulent areas of the flow line or where the flow line changes direction.

It also will be appreciated that corrosion generally tends to weaken material in the part. The part, therefore, is more susceptible to both ductile and brittle erosion. Moreover, since flowline components typically are manufactured from relatively hard steels, brittle erosion from near normal impacts caused by more turbulent flow typically plays a larger role than ductile erosion resulting from more laminar flow.

For example, turbulence and brittle erosion is the primary dynamic in the area where pump discharge lines 12 feed into missiles 13 of conventional frac manifold 9. Fluid from discharge lines 12 immediately hits the other side of missile 13, which is only a few inches away. More specifically, the inner diameter of high-pressure missiles in conventional frac manifolds typically will be sized such that they cumulatively provide the required flow rates (up to 100 bbl/minute) without excessively high fluid velocity through the missiles. The upper limit, often referred to as the erosional fluid velocity, generally is about 40 ft/sec. Thus, missiles in conventional frac manifolds typically will be made up from 3" or 4" components having, respectively, inner diameters of 2.75" and 3.5".

In contrast, novel flow lines having comparable flow rates and velocities will incorporate 5⅛" or 7¹/₁₆" components having, respectively, inner diameters of 5.13" and 7.06". Thus, for example in novel missile 113, it will be appreciated that fluid entering primary bore 122 of offset cross junctions 120 from feed bores 126 will have more room to spread. The quantity and velocity of particles impinging on the other side of primary bore 122 at near normal angles will be less than experienced by smaller diameter pipes, such as missiles 13 in conventional frac manifold 9.

In addition, by providing feed bores 127 with a long-sweep curve instead of a straight-line bore, fluid discharged from feed bores 127 will be directed at an angle more along, and less across the flow of fluid through primary bore 122. Thus, the average angle of impact for particles flowing into primary bore 122 will be diminished. To a certain extent the reduction of average impact angle on the other side of primary bore 122 will come at the expense of feed bore 122. Impact erosion will be greater in feed bore 126 than if it were a straight bore. By providing a long-sweep curve, however, the increase in impact erosion in feed bores 126 will be minimized.

Moreover, offsetting the junctions between feed bores 126 and primary bore 122 will help to minimize areas of concentrated turbulence and erosion in cross junctions 120. Turbulence created by fluid entering primary bore 122 from an upstream feed bore 126 will tend to diminish, and the flow will become more laminar as fluid travels down primary bore 122. Feed bores 126, therefore, preferably are spaced at sufficient distances to allow turbulence from one feed bore 126 to substantially subside before the discharge from the downstream feed bore 126 enters primary bore 122. For example, feed bores 126 may be offset a distance at least approximately equal to the diameter of feed bores 126, and more preferably, at a multiple thereof. Feed bores 126 as illustrated in FIGS. 7-8, for example, are offset by a factor of approximately 7 relative to their diameters. Providing a long-sweep curve in feed bores 126 also will create less initial turbulence, and therefore, laminar flow through cross junction 120 will recover more quickly.

It also will be noted that offset cross junctions 120 may be provided with significantly thicker walls than are present in traditional fittings. That is, junctions 120 preferably are manufactured by starting with a generally cylindrical bar, machining main bore 122, heat treating, and then machining the remaining features, such as feed bores 126, annular grooves 125 and 129, and the annular boss. It will be appreciated that at such thickness, it is difficult or impossible to bend tubular stock. Thus, despite its relatively thick walls, feed bores 126 may be provided with long sweep curves, and at the same time junction 120 can tolerate more erosion before reaching a point where the integrity of the fitting is compromised.

Finally, frac manifolds usually are mounted on a skid or trailer so that they may be transported easily to and from a well site. That is a significant advantage. The need to transport the manifold over roads and highways without special permits, however, limits the size of the skid or trailer platform and can create significant spatial constraints in the design and layout of the manifold. Frac manifolds having two or more missiles, such as frac manifold 9, require very sharp turns in the flow line and often more junctions. For example, each missile typically will make a right turn, or it will tee into a manifolding pipe. Such turns and junctions are particularly susceptible to erosion. They are eliminated in the novel frac manifolds, such as frac trailer 109, which has a single, straight missile, such as missile 113, accepting discharge from both sides of the missile.

Figure 9:
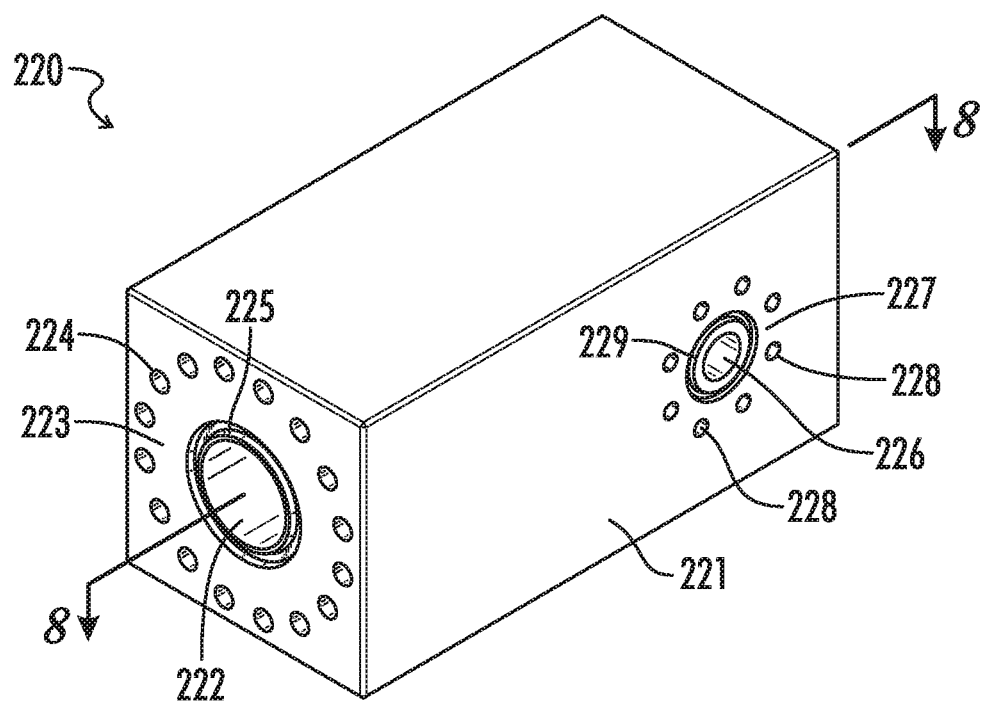
FIG. 9 is an isometric view of a second preferred embodiment of the flowline components of the subject invention, namely, an offset cross junction 220 having straight-line feed bores which may be used, for example, in missile 113 of frac trailer 109.
Figure 10:
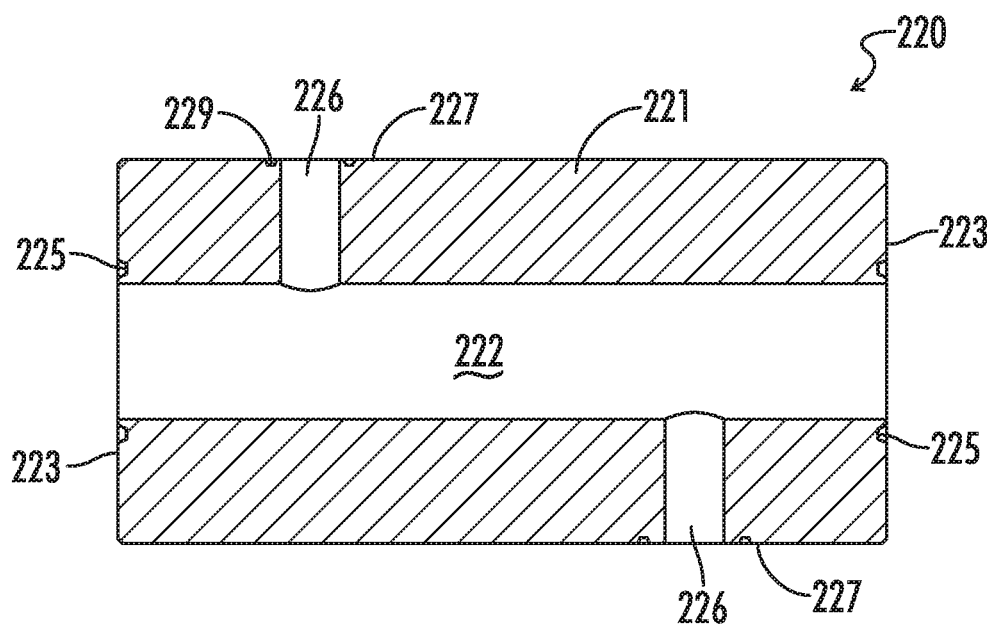
FIG. 10 is a cross-sectional view of offset cross junction 220 shown in FIG. 9.

While offset cross junctions 120 of missile 113 provide many advantages, it will be appreciated that other junctions accepting feed from two or more pumps may be incorporated into the novel missiles and frac manifolds. For example, offset cross junction 220 shown in FIGS. 9-10 may be connected to two pumps 10. As seen therein, offset cross junctions 220 has a somewhat elongated, solid rectangular body 221 having a main bore 222. Bore 222 provides the primary conduit through which slurry passes as it is conveyed towards well head 17. Bore 222 extends between opposing flat surfaces or union faces 223 on body 221.

Offset cross junctions 220 also are provided with a pair of bores 226 which provide conduits for feeding discharge from an individual pump 10 into primary bore 222. Feed bores 226 extend perpendicularly from flat union faces 227 on body 221 and lead into main bore 222. Primary union faces 223 and feed union faces 227 are substantially identical to union faces 123 and 127 in offset cross junction 120.

Like cross junction 120, when cross junctions 220 are incorporated into missile 113 they will have a larger diameter than multiple, smaller flowlines collectively providing comparable flow rates and velocities. The quantity and velocity of particles impinging on the other side of primary bore 222 at near normal angles will be less than experienced by smaller diameter pipes. Feed bores 226 in cross junctions 220 also are offset axially, as in cross junction 120. Offsetting feed bores 226 will help to minimize areas of concentrated turbulence and erosion in cross junctions 220. Unlike cross junctions 120, however, feed bores 226 in cross junctions do not have a long-sweep curve. They are straight-line bores. Thus, the average angle of impact for particles flowing into primary bore 222 will be greater, and will tend to cause more erosion than in cross junction 120.

Offset cross junction 220, however, is a block fitting. That is body 221 of junction has a generally polyhedral configuration or, more specifically an elongated, solid rectangular configuration. As compared to the tubular fittings from which missiles in conventional frac manifolds traditionally are assembled, polyhedral bodies, such as solid rectangular and other prismatic bodies, can easily be manufactured to provide cross junctions 220 with additional thickness in conduit walls. Thus, like cross junctions 120, junctions 220 should be able to tolerate more erosion before reaching a point where the integrity of the fitting is compromised.

Figure 11:
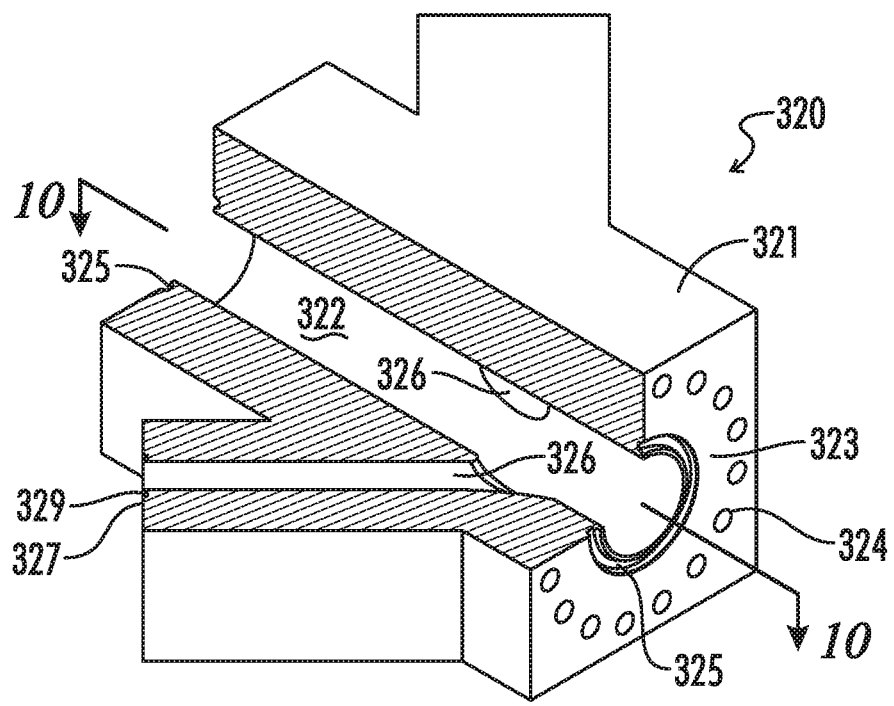
FIG. 11 is an isometric view, with an axial quarter-section removed, of a third preferred embodiment of the flowline components of the subject invention, namely, an offset lateral cross junction 320 having long-sweep feed bores which may be used, for example, in missile 113 of frac trailer 109.
Figure 12:
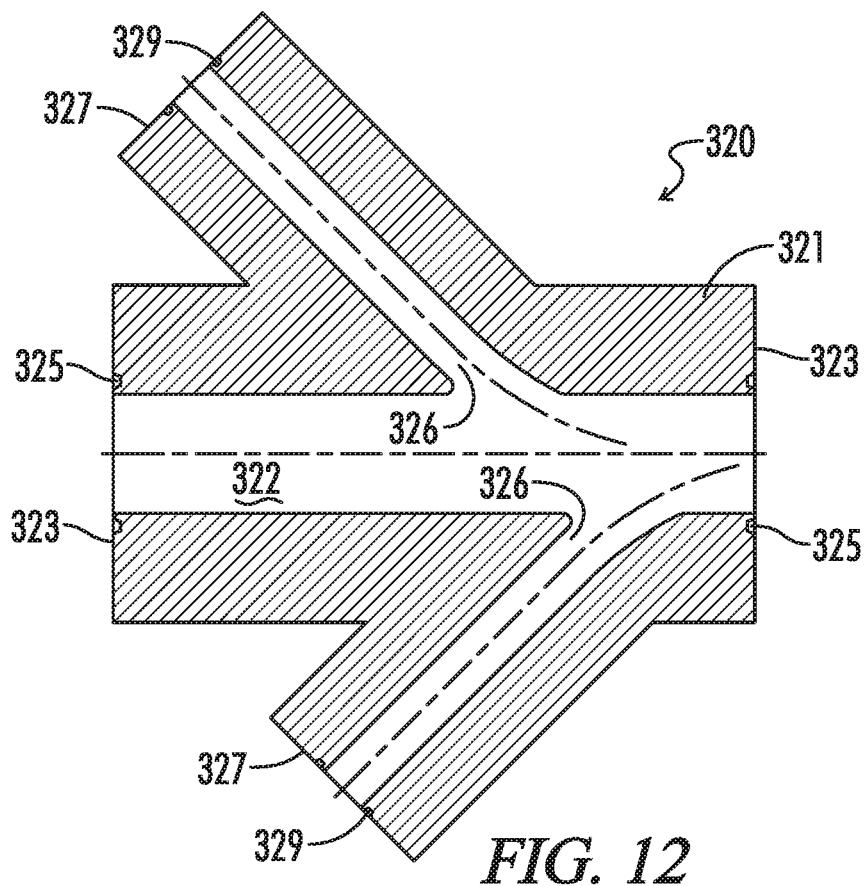
FIG. 12 is a cross-sectional view of offset lateral cross junction 320 shown in FIG. 11.

Offset lateral cross junction 320 is shown in FIGS. 11-12. Junction 320 may be referred to as an offset "lateral" cross junction in that their feed bores intersect with the primary bore a shallower angle, as compared to a tee fitting which intersects more or less normal to the primary bore. Junctions 320 also may be incorporated into missile 113 and connected to two pumps 10. As may be seen in FIGS. 11-12, offset lateral cross junction 320 has a body 321. The main portion of body 321 is polyhedral and, more specifically, has a generally cuboid shape with trapezoidal prism shaped arms extending from opposite faces. Body 321 has a main bore 322. Bore 322 provides the primary conduit through which slurry passes as it is conveyed towards well head 17. Bore 322 extends between opposing flat surfaces or union faces 323 on body 321.

Offset lateral cross junctions 320 also are provided with a pair of bores 326 which provide conduits for feeding discharge from an individual pump 10 into primary bore 322. Bores 326 extend perpendicularly from flat union faces 327 on body 321 and lead into main bore 322. Primary union faces 323 and feed union faces 327 are substantially identical to union faces 123 and 127 in offset cross junction 120.

It will be noted that bores 326 of offset lateral cross junction 320 generally extend toward main bore 322 at an interior angle, for example, 45° as shown in FIG. 12. The major portion of bores 326 extends along that angle, and feed bores 326 may be deemed to intersect with primary bore 322 at that angle. As they approach primary bore 322, however, bores 326 are provided with a long-sweep curve having a sweep radius of approximately 7. Bores 326 also intersect with main bore 322 at axially offset junctions. Thus, it is expected that lateral cross junction 320 will provide further improvements in wear resistance and service life. Fluid entering primary bore 322 of lateral cross junctions 320 from feed bores 326 will not only have more room to spread, but will enter primary bore at a shallower angle. Discharge will be further encouraged to flow more along and less across flow in primary conduit 322 by the long-sweep curves. Particles impinging on the other side of primary bore 322 on average will impact at much shallower angles, further reducing the effects of brittle erosion. Flow through primary bore 322 also will return to laminar flow more quickly.

Consistent therewith, the intersection angle between feed bores 326 and primary bore 322 may be varied. Preferably, it will be substantially less than 90°. Little benefit will be realized at angles near 90°. More preferably, the intersection angle will be from about 15° to about 60°. Likewise, the sweep ratio of the curve may be varied. Given that feed bores 326 already approach primary bore 322 at an angle, the sweep ratio will tend to be somewhat higher than, for example, in feed bores 126 of cross junctions 120, which approach at right angles to primary bore 122. It also will be appreciated, as compared to the offset between feed bores 126 in offset cross junction 120, feed bores 326 in lateral cross junction 320 may be offset to a lesser degree. Since fluid is entering primary bore 322 at a shallower angle, turbulence in primary bore 322 will diminish more rapidly, and assume a more laminar flow than in primary bore 122 of offset cross junction 120.

Figure 13:
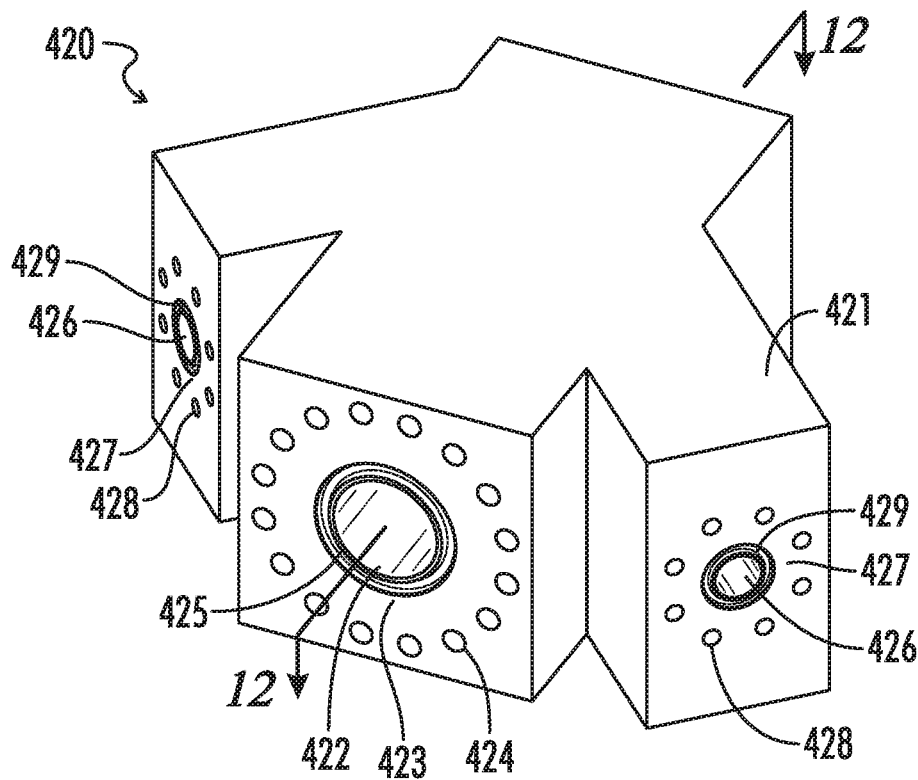
FIG. 13 is an isometric view of a fourth preferred embodiment of the flowline components of the subject invention, namely, an offset lateral cross junction 420 having straight-line feed bores which may be used, for example, in missile 113 of frac trailer 109.
Figure 14:
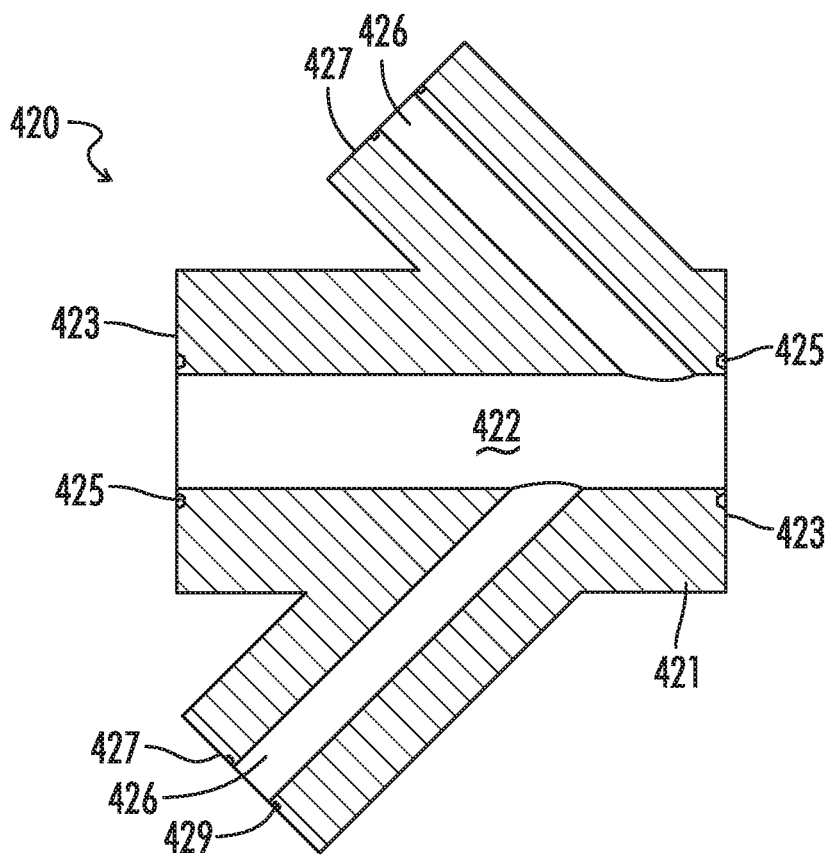
FIG. 14 is a cross-sectional view of offset lateral cross junction 420 shown in FIG. 13.

Offset lateral cross junction 420 also may be connected to two pumps and used in missile 113 or elsewhere in flow line 100. As may be seen in FIGS. 13-14, offset lateral cross junction 420 is substantially identical to offset lateral cross junction 320 except that feed bores 426 injunction 420 do not incorporate a long-sweep curve. It may be modified and adapted in various respects as can be junction 320.

Figure 15:
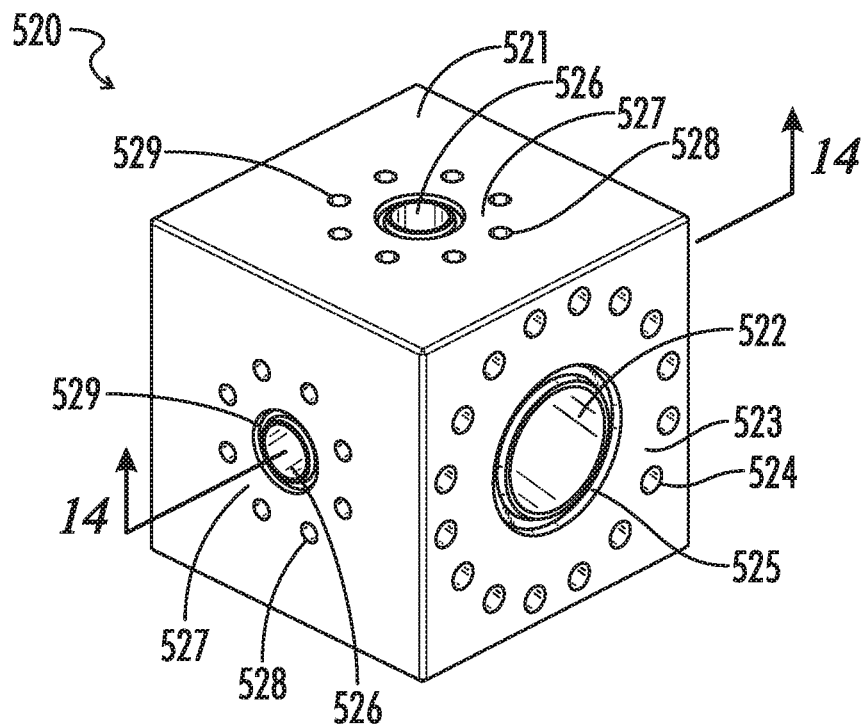
FIG. 15 is an isometric view of a fifth preferred embodiment of the flowline components of the subject invention, namely, a cross junction 520 having right-angle feed bores which may be used, for example, in missile 113 of frac trailer 109.
Figure 16:
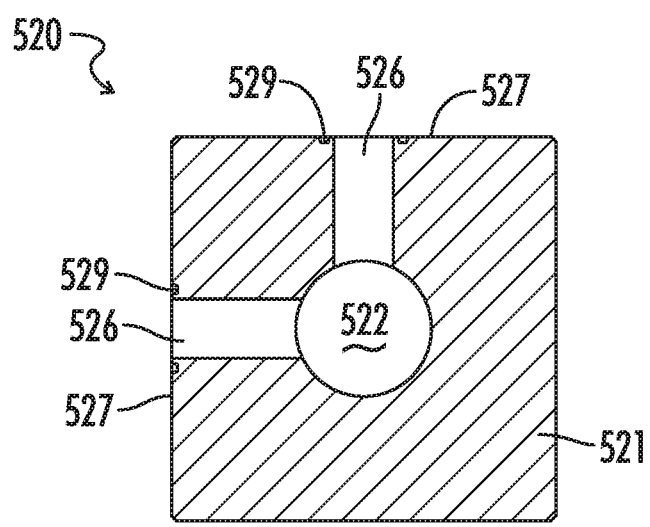
FIG. 16 is a cross-sectional view of right-angle cross junction 520 shown in FIG. 15.

Right-angle cross junction 520, which is shown in FIGS. 15-16, also may be incorporated into missile 113 and connected to two pumps 10. Right-angle cross junction 520 has a polyhedral or, more specifically, a generally cubic body 521. Main bore 522 extends through body 521 and provides the primary conduit through which slurry passes as it is conveyed towards well head 17. Bore 522 extends between opposing flat surfaces or union faces 523 on body 521.

Right-angle cross junctions 520 also are provided with a pair of bores 526 which provide conduits for feeding discharge from an individual pump 10 into primary bore 522. Bores 526 extend perpendicularly from adjacent flat union faces 527 on body 521 and lead into main bore 522. Primary union faces 523 and feed union faces 527 are substantially identical to union faces 123 and 127 in offset cross junction 120.

It will be noted that bores 526 in right-angle cross junctions 520 are perpendicular to each other and intersect with main bore 522 and each other at right angles. Right-angle cross junctions 520, therefore, may make it easier to assemble pump discharge lines 12 from pumps 10 on either side of cross junction 520. Consistent therewith, it will be appreciated that the angle between bores 526 and union faces 527 may be varied. The angle may be somewhat greater or lesser than 90° and still facilitate connection of pump discharge lines 12 from pumps staged on opposite sides of cross junction 520. Bores 526 also may be offset along main bore 522, similar to offset cross junction 220, may intersect with main bore 522 at an angle, similar to offset lateral cross junction 420, or may incorporate both such features. Similarly, feed bores 526 may incorporate a long-sweep curve, such as is present in feed bores 126 of junction 120 and feed bores 326 of junction 320, to further minimize erosion in junction 520.

Figure 5:
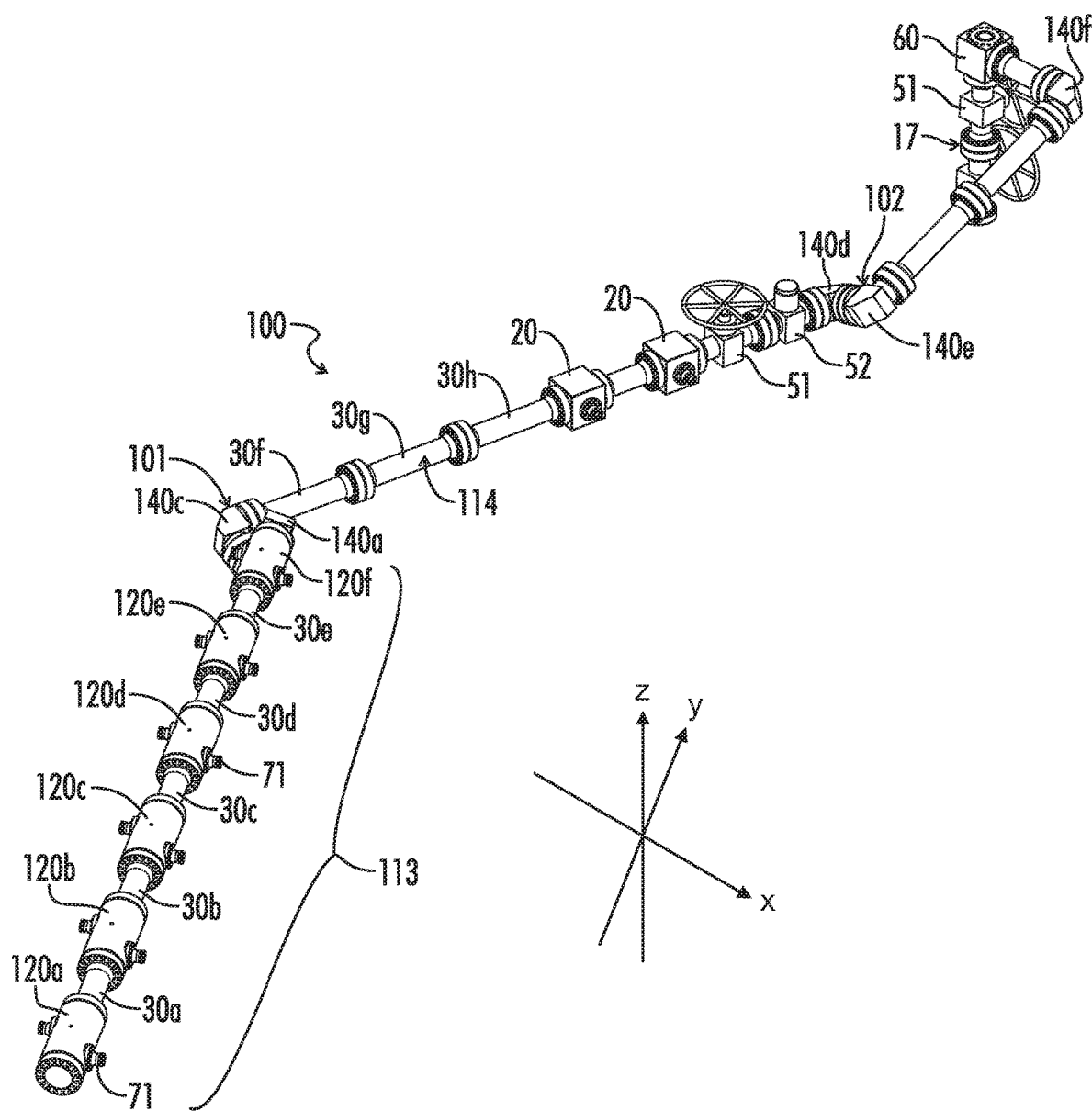
FIG. 5 is an isometric view of novel flow line 100 comprising missile 113 of frac trailer 109 and high-pressure flow line 114.
Figure 6:
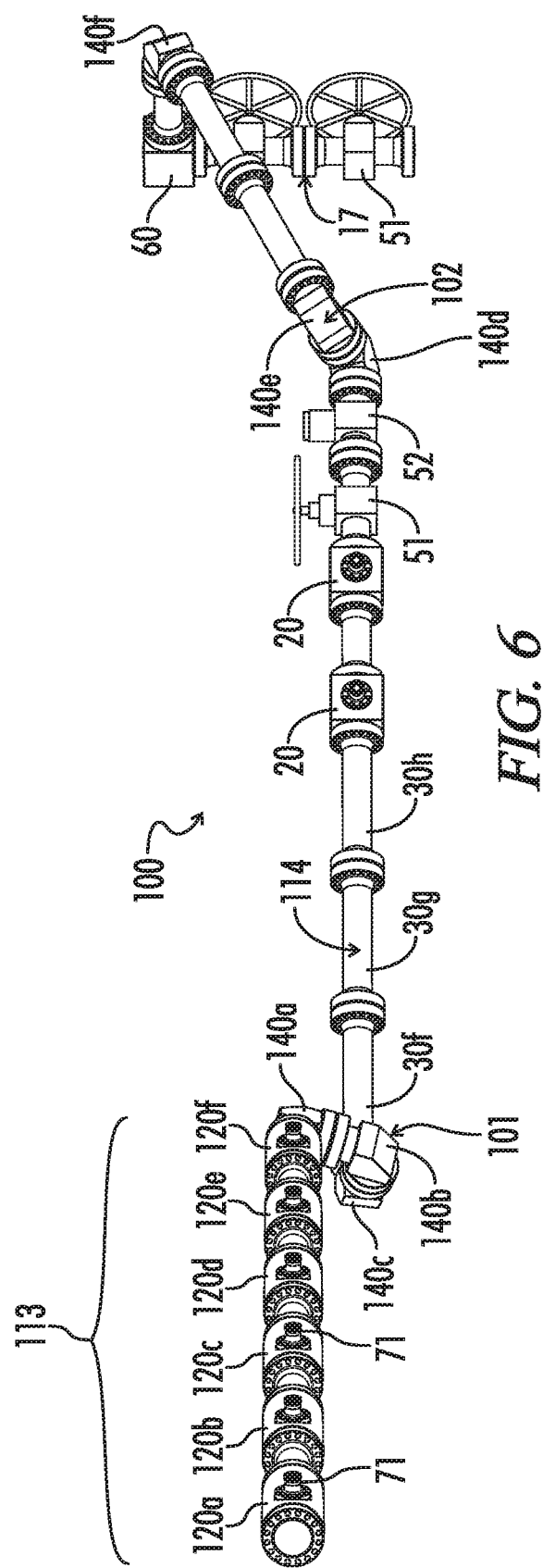
FIG. 6 is an elevational view of flow line 100 shown in FIG. 5.

Missile 113 will discharge into flow line 114. Flow line 114 is shown in more detail in FIGS. 5-6. As shown therein, it generally comprises a 4-axis swivel joint subassembly 101 having three rotatable elbows 140, additional spools 30, cross junctions 20, valves 51 and 52, a 3-axis swivel joint subassembly 102 having two rotatable elbows 140, and a single rotatable elbow 140f. It will be noted that for the sake of simplification, FIGS. 5-6 show flow line 114 as connecting to a single well head 17 whereas in FIG. 2 flowline is illustrated as feeding into junction head 112 of zipper manifold 16.

Well head 17 comprises a tee connector 60 and a pair of manual gate valves 51. In accordance with common industry practice, many other components may be assembled into well head 17. Such components also are not illustrated for the sake of simplicity. It also will be appreciated that in the context of novel flow lines which are adapted to deliver fluid from a plurality of pump discharges to a well head, the well head not only will be considered to include such conventional well head assemblies, but also zipper manifolds and the like which may selectively divert flow into a plurality of individual well heads.

Flowline segment 114, as illustrated, may incorporate additional or fewer spools 30 of varying lengths running from missile 113 to make up the distance between frac manifold 109 and well head 17. The novel flow lines also may incorporate other conventional flowline components, units, and subassemblies. For example, flowline segment 114 incorporates cross junctions 20. Cross junctions 20 may be used to allow additional flowline components or segments to be added, such as pressure relief valves or bleed-off lines. The novel flow lines also may incorporate, for example, gauges and other monitoring equipment, as well as control devices such as shut off, plug, check, throttle, pressure release, butterfly, and choke valves. For example, flow line 114 is provided with valves 50 and 51. Valve 50 is a conventional manual gate valve. Valve 51 is a conventional hydraulic valve which may be controlled remotely.

Figure 17:
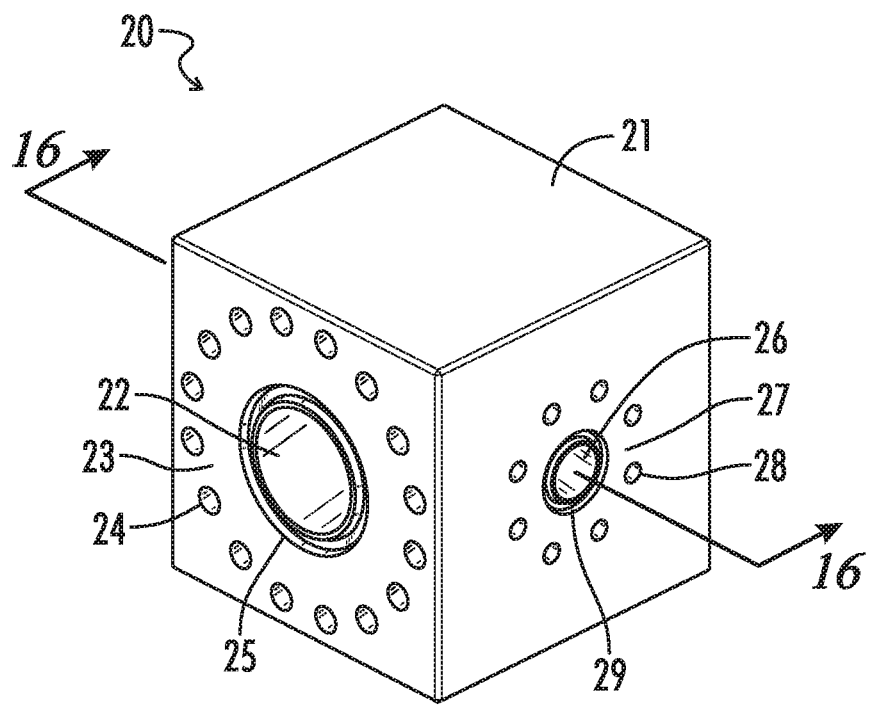
FIG. 17 is an isometric view of a cross junction 20 used in flow line 114.
Figure 18:
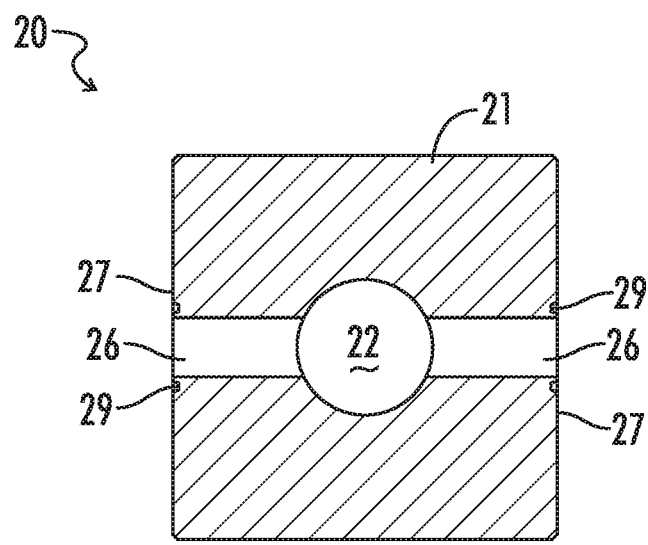
FIG. 18 is a cross-sectional view of cross junction 20 shown in FIG. 17.

Cross junctions 20 are shown in greater detail in FIGS. 17-18. As seen therein, cross junction 20 has a generally cubic body 21 having a main bore 22. Bore 22 provides the primary conduit through which slurry passes as it is conveyed towards well head 17. Bore 22 extends between opposing flat surfaces or union faces 23 on body 21. Cross junctions 20 also are provided with a pair of bores 26 which provide conduits for feeding fluid from other flow lines into flowline segment 114, or for diverting fluid from primary bore 22. Bores 26 extend from opposing flat union faces 27 on body 21 and lead into and intersect with main bore 22. Primary union faces 23 and feed union faces 27 are substantially identical to union faces 123 and 127 in offset cross junction 120.

It will be noted that bores 26 are aligned along their central axes and intersect with main bore 22 at right angles. Thus, it will be appreciated that cross junctions 20 may be more suitable for diverting flow from a main flow line, such as flow line 114 and as illustrated in FIGS. 5-6. They may be used to connect pumps 10, but opposing high-pressure, high-velocity flows, such as the discharge from pumps 10, may create undesirable harmonics in the system and lead to excessive vibration. Feed bores 26, however, may be modified to incorporate a long-sweep curve, such as is present in feed bores 126 of junction 120, to reduce such harmonics and to further minimize erosion injunction 20.

Flow lines necessarily must change course as flow is split or combined. Ideally, however, those portions of a flow line extending between junction fittings, would extend in a straight line. Unfortunately, that rarely, if ever, is possible. For example, as best appreciated from FIGS. 5-6, in flowline 100, junctions 120 in missile 113 are all aligned and extend in a straight line along they-axis. Junctions 120 and missile 113, however, are not aligned with well head tee connector 60, which has a union face oriented more or less perpendicular to the x-axis. It also is rarely practical to position pumping units 10, frac trailer 109, and other frac equipment such that they are aligned. There is a large amount of equipment at a well site, especially during fracturing operations. The flow line must be able to accommodate whatever spatial constraints are present at a site.

Thus, the novel flow lines may incorporate various fittings, such as various combinations of novel rotatable elbows 140, to change the direction or course of the flow line as required for a specific well site. For example, as shown in FIGS. 5-6, missile 113 runs straight along (i.e., parallel to) they-axis between offset cross junction 120a and offset cross junction 120f. The heading of flow line 100 may be changed by incorporating various combinations of rotatable elbows 140. Specifically, 4-axis swivel joint 101, 3-axis swivel joint 102, and rotatable elbow 140f have been used to provide changes in the heading of flow line 100 to accommodate the position of frac manifold 109 relative to well head 17.

Swivel joints 101 and 102 comprise, respectively, three and two rotatable elbows 140 assembled together. More specifically, as may be seen in FIGS. 5-6, swivel joint 101 comprises three rotatable elbows 140a, 140b, and 140c. Though not fully illustrated in the figures, it will be appreciated that each rotatable elbow 140 generally comprises a body and two flanges. A central bore makes a long-sweep 90o turn within the body between two, mutually perpendicular union faces. The flanges are rotatably mounted on the elbow body on threads extending around the bore openings. The rotatable flanges allow elbows 140 to be made up at the union faces to each other and to other flowline components by a rotatable, flange-type union. The union allows elbows 140 to rotate to any degree relative to an adjacent flowline component before the union is loaded and fully tightened. Thus, elbows 140 may provide a 90° turn to the left, to the right, or at any angle relative to the adjacent component.

Rotatable elbows 140 are described more fully in applicant's U.S. patent application Ser. No. 15/499,673, filed Apr. 27, 2017, the disclosure of which is incorporated herein by reference. It will be noted that rotatable elbows 140 and swivel joints 101 and 102 shown in FIGS. 5-6 are substantially identical, respectively, to rotatable elbows 140 and swivel joints 101 and 102 disclosed in the '673 application. In any event, rotatable elbows 140 will allow greater control over the angular alignment of components in a flowline and, therefore, over the direction (or heading) and course (or track) of a flowline.

At the same time, it will be appreciated that other fittings may be used to change the direction or course of the flow line as required for a specific well site. For example, various combinations of angled shims, standard spools, and offset spools may be used as described in applicant's U.S. patent application Ser. No. 15/399,102, filed Jan. 5, 2017, the disclosure of which is incorporated herein by reference. While they are more prone to leaking and failure, conventional swivel joints also may be used.

Figure 19:
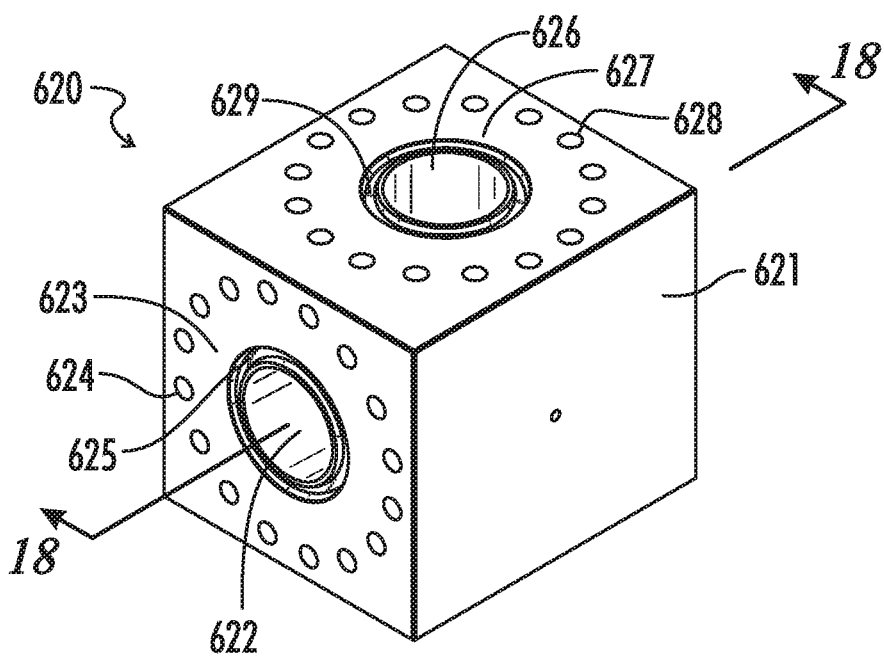
FIG. 19 is an isometric view of a sixth preferred embodiment of the flowline components of the subject invention, namely, a tee junction 620 having a long-sweep feed bore which may be used, for example, in flow line 114.
Figure 20:
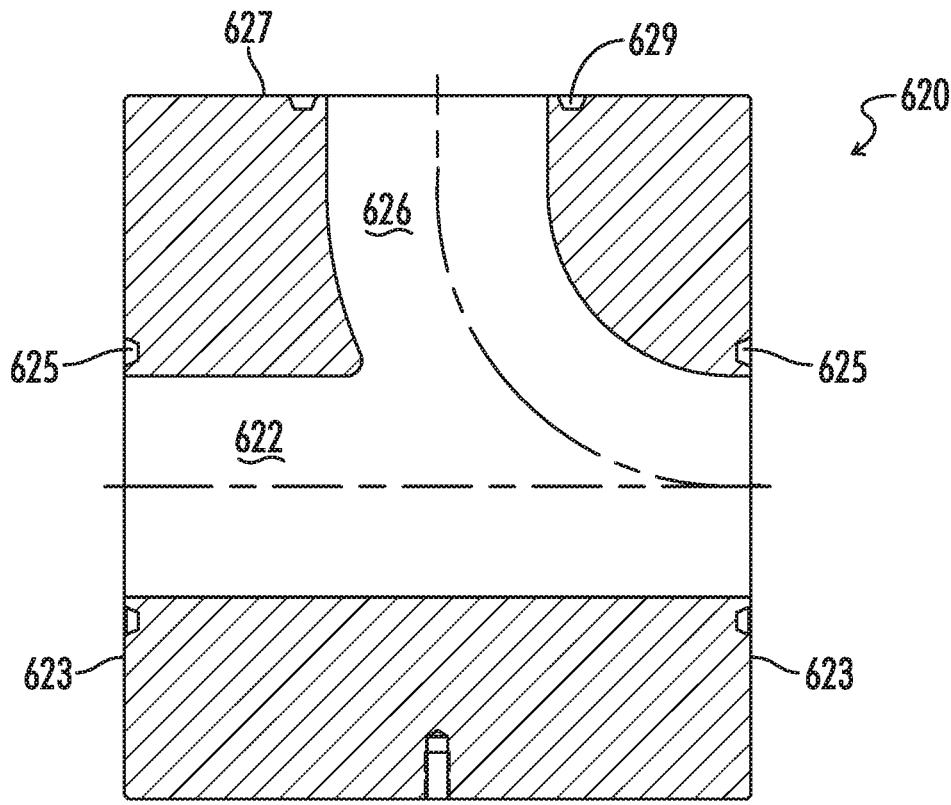
FIG. 20 is a cross-sectional view of tee junction 620 shown in FIG. 19.

The subject invention includes other preferred embodiments which may be used to assemble flow lines. For example, a novel tee junction 620 is shown in FIGS. 19-20. As shown therein, tee junction 620 has a generally cubic body 621 having a main bore 622. Bore 622 provides the primary conduit through which slurry passes as it is conveyed through tee junction 620. Bore 622 extends between opposing flat surfaces or union faces 623 on body 621. Tee junction 620 also is provided with a bore 626 which provides a conduit for feed fluid from other flow lines into, or for diverting fluid out of primary bore 622. Bore 626 extends from a flat union face 627 on body 621 and leads into and intersects with main bore 622. Primary union faces 623 and feed union face 627 are substantially identical to union faces 123 and 127 in offset cross junction 120.

Like bores 126 in offset cross junction 120, feed bore 626 in tee junction 620 is provided with a long-sweep curve leading into primary bore 622. The sweep ratio of bore 626 is approximately 1.33. By providing feed bores 627 with a long-sweep curve instead of a straight-line bore, fluid discharged from feed bores 627 will be directed at an angle more along, and less across the flow of fluid through primary bore 622. It will be expected, then, that the average angle of impact for particles flowing into primary bore 622 will be diminished and, correspondingly, erosion of primary bore 622. Like fitting 120, it also will be appreciated that tee fitting 620 may easily be manufactured with a cylindrical body.

Figure 21:
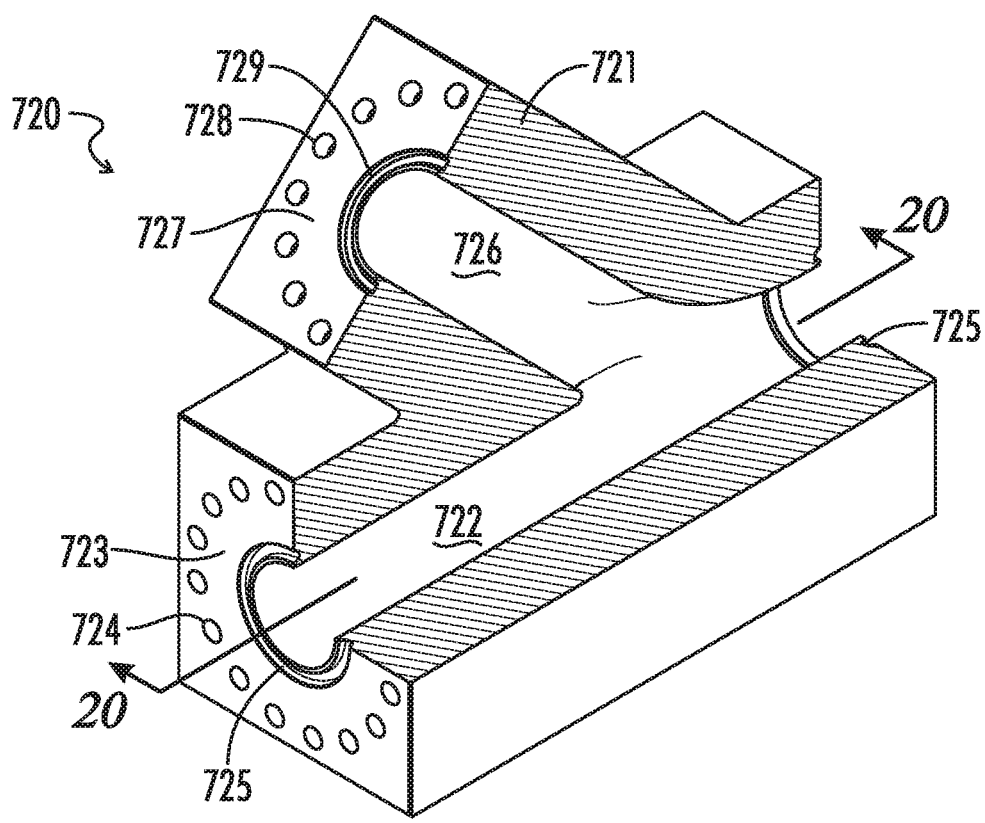
FIG. 21 is an isometric view, with an axial quarter-section removed, of a seventh preferred embodiment of the flowline components of the subject invention, namely, a lateral junction 720 having a long-sweep feed bore which may be used, for example, in flow line 114.
Figure 22:
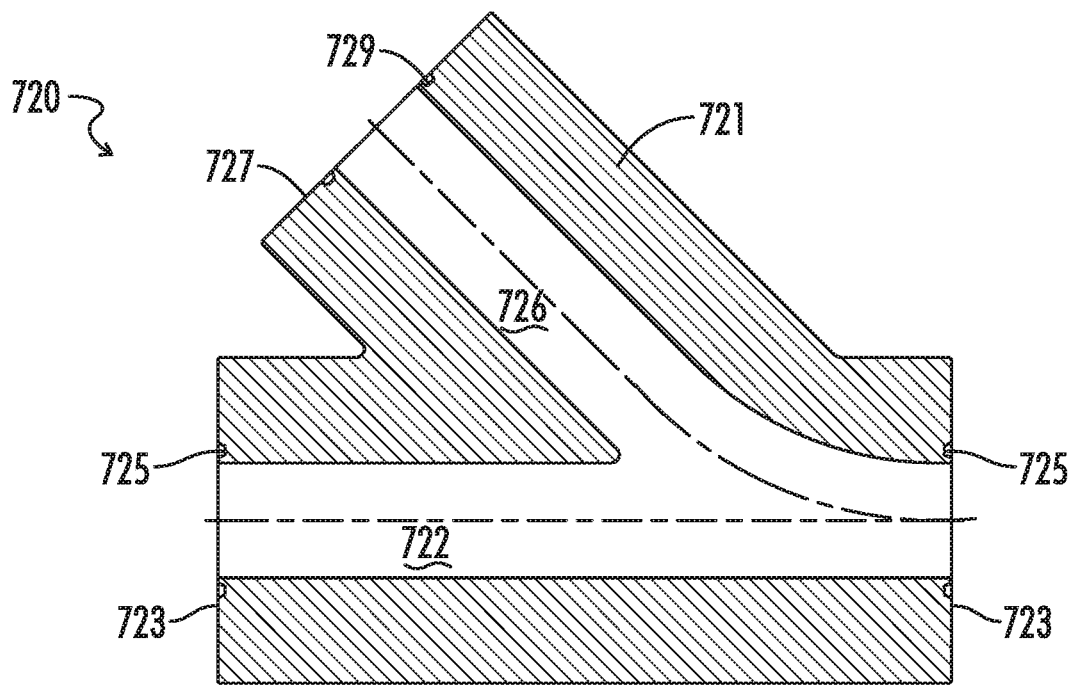
FIG. 22 is a cross-sectional view of lateral junction 720 shown in FIG. 20.

FIGS. 21-22 illustrate a novel lateral junction 720 which is similar in many respects to junctions 320 and 620. Lateral junction 720 has a generally prismatic body 721, what also may be visualized as a elongated solid rectangular body with a prismatic extension off of a face thereof. In any event, body 721 has a main bore 722 which provides the primary conduit through which slurry passes as it is conveyed through lateral junction 720. Bore extends between opposing flat surfaces or union faces 723 on body 721. Lateral junction 720 also is provided with a bore 726 which provides a conduit for feed fluid from other flow lines into, or for diverting fluid out of primary bore 722. Bore 726 extends from a flat union face 727 on body 721 and leads into and intersects with main bore 722. Primary union faces 723 and feed union face 727 are substantially identical to union faces 123 and 127 in offset cross junction 120.

Like bores 326 in offset lateral cross junction 320, feed bore 726 in lateral junction 720 generally extends toward main bore 722 at an interior angle of about 45°. As it approaches primary bore 722, however, bore 726 is provided with a long-sweep curve having a sweep radius of approximately 3.5. It may be expected, therefore, that erosion in primary bore 726 will be reduced.

The flowline components of the subject invention may be manufactured by methods and from materials commonly used in manufacturing flow iron components. Given the extreme stress and the corrosive and abrasive fluids to which flowline components are exposed, especially those designed for high-pressure, high-velocity flow lines, suitable materials will be hard and strong. For example, the novel junctions, except for their seals, may be manufactured from 4130 and 4140 chromoly steel or from somewhat harder, stronger steel such as 4130M7, high end nickel alloys, and stainless steel. The components may be made by any number of conventional techniques, but typically and in large part will be made by forging, extruding, or mold casting a blank part and then machining the required features into the part. Conventional components of the novel flow lines are widely available from a number of manufacturers.

The novel junctions also may incorporate spanning and other wear sleeves as disclosed in applicant's '102 application. Such wear sleeves can provide additional resistance to erosion and wear, especially when provided in areas subject to turbulent flow. Wear sleeves also may be replaced after a period of service, thus avoiding the need to scrap an entire part.

The novel flowline components have been exemplified largely in the context of assembling flow lines through flange unions. That is, fittings such as offset cross junction 120, have been exemplified as having union faces adapted for connection to another flowline component by a flange union. If desired, however, other types of unions may be used in the novel flow lines. Flanged hammer union or clamp union subs may be joined to a block fitting by a flange union, allowing additional components to be joined by a hammer union or a clamp union. A hammer union sub or a clamp union sub also may be provided integrally on the novel fittings if desired, although as noted below, various advantages may be gained by assembling the novel flow lines with flange unions.

In general, the novel fittings may be manufactured easily in any of the sizes commonly employed for frac iron. They are not limited to a particular size. At the same time, however, when manufactured in relative large sizes with relatively large internal diameters, the novel fittings and flow lines may provide a single, relatively large flowline over much of the high-pressure side of a frac system. Flow line 100, for example, runs from pump discharges lines 12 all the way to well head 17. Various advantages may be derived therefrom.

First, the overall layout at a well site is greatly simplified. Simplification of the frac system can create space to access other portions of the system and reduce confusion among workers at the site. Moreover, by replacing multiple lines with a single line, the total number of components in the system may be reduced. Fewer components mean fewer junctions and fewer potential leak and failure points in the system. Fewer components also means less assembly time at a well site.

Second, exposed elastomeric seals are a potential source of leaks. They also increase turbulence through a conduit and, therefore, erosion resulting from the flow of abrasive slurry through the flow line. The novel flow lines, however, preferably are assembled using flange unions. Flange unions do not have any exposed elastomeric seals. They have internal metal seals situated between the union faces. Thus, preferred fittings, such as offset cross junctions 120, have union faces adapted for flange unions, and flow line 100 does not have any exposed elastomeric seals other than those that necessarily may be present in components such as control valves.

It will be noted in particular that preferred flow lines, such as flow line 114, are able to accommodate changes in direction without conventional directional fittings such as elbows, but especially without using swivel joints. Swivel joints are expensive. They incorporate elastomeric seals and packings. Many also have sharp turns which are particularly susceptible to erosion. Moreover, they are particularly susceptible to bending stress caused by vibrations in the flow line. Such strain can lead to failure. In any event, it means that swivel joints have a relatively shorter service life than many flowline components. Thus, swivel joints not only are a big component of the overall cost of a flow line, but they are a primary source of potential leaks and failure.

The relatively large inner diameter of the novel flowlines such as missile 113 and flow line 114 can help minimize erosion and failure in other ways. As the diameter of a conduit increases, drag on the fluid passing through the conduit increases, but not as rapidly as the volume of fluid. Thus, proportionally there is less drag, and flow through the conduit is more laminar. Moreover, by replacing multiple smaller lines with a single larger line, overall drag on fluid conveyed through the system is reduced. For example, a single 7$\frac{1}{16}$ line may replace six 3" lines. The drag through the larger line will be less than half the cumulative drag through the six smaller lines. More importantly, less drag means less erosion.

As noted above, the long-sweep curves provided in many embodiments of the novel fittings further reduce drag by reducing turbulence at the bore intersections. In this regard, it will be appreciated that optimal sweep ratios may vary from fitting to fitting. In general, larger diameter feed bores will have smaller sweep ratios than similarly curved bores with smaller diameters. Low ratios, especially for small diameter bores, will mean a more severe curve which can lead to increased erosion in the feed bore. Higher ratios, regardless of the bore diameter, will direct fluid more along, and less across flow in the main bore, but will necessarily either add to the overall length of the bore or will diminish the length of the curve. In general, however, for the bore sizes typically used in frac iron, it is expected that a sweep ratio of from about 1.25 to about 8 generally will be preferred. In any event, the more gradual turns provided by various embodiments of the novel fittings will tend to reduce the angle of impingement of abrasive particles on the conduit walls and will help reduce brittle erosion through the flow line.

Similarly, the novel flow lines and components have been described in the context of frac systems. While frac systems in particular and the oil and gas industry in general rely on temporary flow lines, the novel unions are not limited to such applications or industries. Suffice it to say that the novel flow lines and components have wide applicability in those fluid transportation systems where temporary flow lines have been conventionally applied.

While this invention has been disclosed and discussed primarily in terms of specific embodiments thereof, it is not intended to be limited thereto. Other modifications and embodiments will be apparent to the worker in the art.

What is claimed is:

1. A flowline junction fitting adapted to combine the flow from at least two flowlines, said junction fitting comprising:
   (a) a body having a straight-line primary bore and a feed bore;
   (b) said primary bore extending axially through said body between first and second primary union faces adapted for connection to a flowline component by a flange union;
   (c) said feed bore extending through said body from a feed union face to an intersection with said primary bore, said feed union face being adapted for connection to a flowline component by a flange union;
   (d) said feed bore forming a long sweep curve into said primary bore.

2. The flowline fitting of claim 1, wherein said feed bore has a sweep ratio of from about 1.25 to about 8.

3. The flowline fitting of claim 1, wherein said feed bore intersects with said primary bore at an angle of approximately 90°.

4. The flowline fitting of claim 1, wherein said feed bore intersects with said primary bore at an interior angle of about 45°.

5. The flowline fitting of claim 1, wherein said feed bore intersects with said primary bore at an interior angle of from about 15° to about 60°.

6. The flowline fitting of claim 1, wherein said fitting comprises a second said feed bore.

7. The flowline fitting of claim 3, wherein said feed bore has a sweep ratio of from about 1.25 to about 8.

8. The flowline fitting of claim 4, wherein said feed bore has a sweep ratio of from about 1.25 to about 8.

9. The flowline fitting of claim 5, wherein said feed bore has a sweep ratio of from about 1.25 to about 8.

10. The flowline fitting of claim 2, wherein said fitting comprises a second said feed bore.

11. The flowline fitting of claim 7, wherein said fitting comprises a second said feed bore.

12. The flowline fitting of claim 8, wherein said fitting comprises a second said feed bore.

13. The flowline fitting of claim 9, wherein said fitting comprises a second said feed bore.

14. A flow line for a system for fracturing a well, said flow line comprising the flowline junction fitting of claim 1.

15. A flow line for a system for fracturing a well, said flow line comprising the flow-line junction fitting of claim 2.

16. A flow line for a system for fracturing a well, said flow line comprising the flowline junction fitting of claim 3.

17. A flow line for a system for fracturing a well, said flow line comprising the flowline junction fitting of claim 5.

18. A flow line for a system for fracturing a well, said flow line comprising the flowline junction fitting of claim 6.

19. A flow line for a system for fracturing a well, said flow line comprising the flowline junction fitting of claim 7.

20. A flow line for a system for fracturing a well, said flow line comprising the flowline junction fitting of claim 9.

* * * * *